US012610220B2

(12) United States Patent
Kim

(10) Patent No.: US 12,610,220 B2
(45) Date of Patent: Apr. 21, 2026

(54) ELECTRONIC DEVICE AND OFFLINE DEVICE REGISTRATION METHOD

(71) Applicant: SAMSUNG ELECTRONICS CO., LTD., Suwon-si (KR)

(72) Inventor: Taegu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 18/230,967

(22) Filed: Aug. 7, 2023

(65) Prior Publication Data

US 2023/0422009 A1     Dec. 28, 2023

Related U.S. Application Data

(63) Continuation of application No. PCT/KR2023/008490, filed on Jun. 20, 2023.

(30) Foreign Application Priority Data

Jun. 22, 2022     (KR) ........................ 10-2022-0076362
Aug. 4, 2022     (KR) ........................ 10-2022-0097310

(51) Int. Cl.
*H04W 4/70*          (2018.01)
*G10L 15/22*          (2006.01)
          (Continued)

(52) U.S. Cl.
CPC ............... *H04W 4/70* (2018.02); *G10L 15/22* (2013.01); *H04W 8/005* (2013.01); *H04W 76/14* (2018.02); *G10L 2015/223* (2013.01)

(58) Field of Classification Search
CPC ....... H04W 4/70; H04W 8/005; H04W 76/14; G10L 15/22; G10L 2015/223
See application file for complete search history.

(56) References Cited

U.S. PATENT DOCUMENTS 9,179,175 B2     11/2015     Kim et al.
9,189,196 B2     11/2015     Doherty et al.
          (Continued)

FOREIGN PATENT DOCUMENTS

EP          4160592 B1 *     6/2025     ........... H04L 67/125
KR     10-2004-0042242 A     5/2004
          (Continued)

OTHER PUBLICATIONS

Abdelaziz A. Abdelhamid et al., "Robust voice user interface for internet-of-things", Journal of Intelligent & Fuzzy Systems: Applications in Engineering and Technology, vol. 41, Issue 6, Jan. 1, 2021, pp. 5887-5902, DOI: 10.3233/JIFS-201781.
          (Continued)

*Primary Examiner* — Noel R Beharry
*Assistant Examiner* — Phillip J Kearns
(74) *Attorney, Agent, or Firm* — Sughrue Mion, PLLC

(57)          ABSTRACT

An electronic device includes a communication module configured to communicate with at least one nearby device in a communication range, a memory configured to store information about the electronic device and at least one instruction, and at least one processor operatively connected to the communication module and the memory. The at least one processor is configured to execute the at least one instruction to: verify, based on an utterance of a device control instruction for a target device, whether the target device is registered in the electronic device, search for the target device among the at least one nearby device based on a determination that the target device is a device not registered in the electronic device, and perform offline device registration of the target device by performing communication with a found device found by the search.

10 Claims, 15 Drawing Sheets

(51) Int. Cl.
    *H04W 8/00*       (2009.01)
    *H04W 76/14*     (2018.01)

(56) References Cited

U.S. PATENT DOCUMENTS

| | | | |
|---|---|---|---|
| 9,978,260 B2 | 5/2018 | Lee et al. | |
| 10,149,329 B2* | 12/2018 | Yu | H04W 76/14 |
| 10,909,981 B2 | 2/2021 | Bai | |
| 2004/0093219 A1 | 5/2004 | Shin et al. | |
| 2016/0113049 A1* | 4/2016 | Kim | H04W 76/14 |
| | | | 455/41.2 |
| 2020/0154261 A1* | 5/2020 | Ko | H04W 84/18 |
| 2020/0294503 A1* | 9/2020 | Ryu | G06F 3/167 |
| 2021/0117151 A1* | 4/2021 | Cho | G10L 15/22 |
| 2021/0118582 A1 | 4/2021 | Lee et al. | |
| 2021/0151052 A1 | 5/2021 | Kang et al. | |
| 2022/0029848 A1 | 1/2022 | Ju | |

FOREIGN PATENT DOCUMENTS

| | | |
|---|---|---|
| KR | 10-0844137 B1 | 7/2008 |
| KR | 10-2014-0079328 A | 6/2014 |
| KR | 10-1772653 B1 | 8/2017 |
| KR | 10-2019-0130376 A | 11/2019 |

OTHER PUBLICATIONS

International Search Report (PCT/ISA/210) issued on Sep. 12, 2023 by the International Searching Authority in International Patent Application No. PCT/KR2023/008490.

* cited by examiner

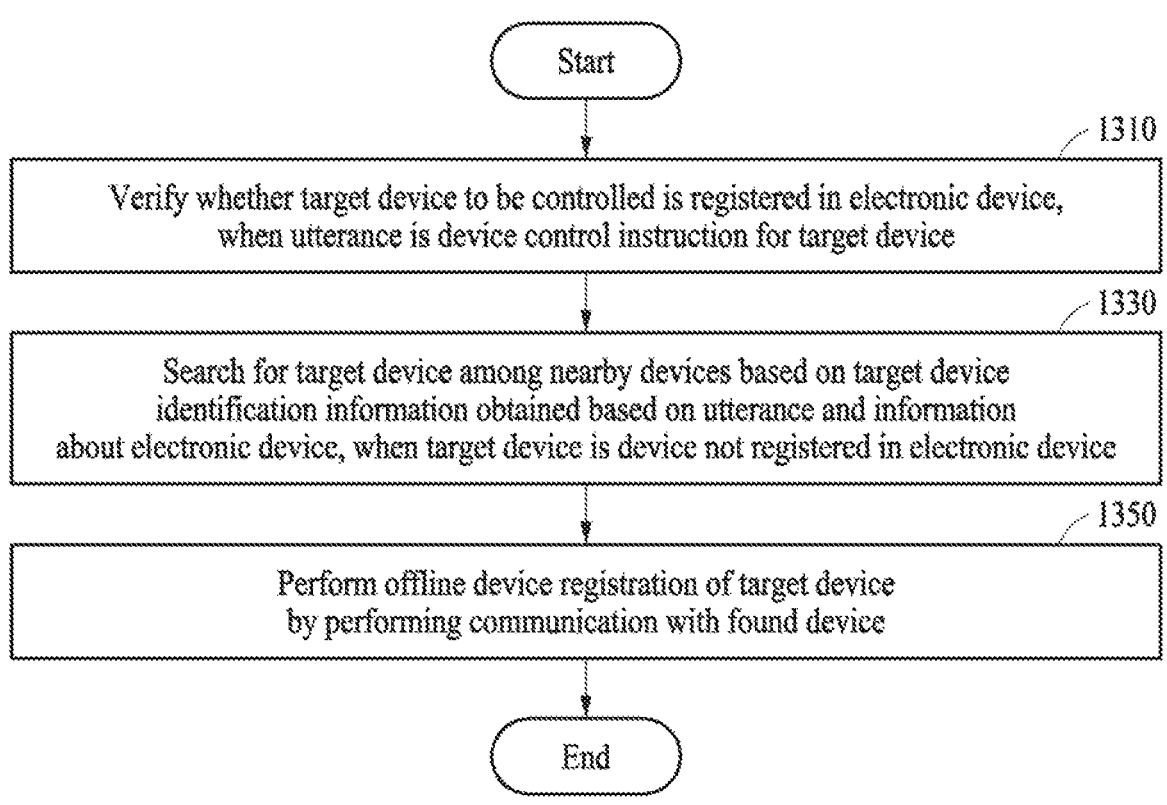

Start

1310

Verify whether target device to be controlled is registered in electronic device, when utterance is device control instruction for target device

1330

Search for target device among nearby devices based on target device identification information obtained based on utterance and information about electronic device, when target device is device not registered in electronic device

1350

Perform offline device registration of target device by performing communication with found device End

FIG. 13

ELECTRONIC DEVICE AND OFFLINE DEVICE REGISTRATION METHOD

CROSS-REFERENCE TO RELATED APPLICATIONS

This application is a bypass continuation of PCT International Application No. PCT/KR2023/008490, which was filed on Jun. 20, 2023, and claims priority to Korean Patent Application No. 10-2022-0076362, filed on Jun. 22, 2022, and Korean Patent Application No. 10-2022-0097310, filed on Aug. 4, 2022, in the Korean Intellectual Property Office, the disclosures of which are incorporated herein by reference in their entireties.

BACKGROUND

1. Field

The disclosure relates to an electronic device and a registration method for a target device.

2. Description of Related Art

With the development of multimedia technology and network technology, users may receive various services using electronic devices. For example, with the development of speech recognition technology, a user may input a speech (e.g., an utterance) into an electronic device and receive a response message according to the input speech through a voice assistant (e.g., a voice assistant service).

The user may control an Internet of Things (IoT) device through an utterance based on the voice assistant. The IoT device may perform a function of the electronic device or support a function that is performed by another electronic device, in response to the utterance of the user.

SUMMARY

A user may control only an Internet of Things (IoT) device registered in (e.g., onboard) a device control application (e.g., SmartThings application). When the user utters "Turn up the TV volume" to control an IoT device (e.g., TV) that is not registered in the device control application, a voice assistant finishes answering after displaying a user interface (UI) of "Add devices to the device control application" while replying "No device is found". Accordingly, when the user decides to add a device, procedures such as nearby device search and device information (e.g., device location, device personal identification number (PIN)) input are required. In addition, to register a device in the device control application, an online connection (e.g., online connection through a telecommunication network, etc.) of devices is essentially required. Due to inconvenient factors that inputting device information takes time and essentially requires an Internet connection, users do not register devices in practice in many cases. A technique for performing device registration in a device control application offline through a simplified procedure may be required.

According to an aspect of the disclosure, an electronic device includes: a communication module configured to communicate with at least one nearby device located in a communication range of the electronic device; a memory configured to store information about the electronic device and at least one instruction; and at least one processor operatively connected to the communication module and the memory. The at least one processor is configured to execute the at least one instruction to: verify, based on an utterance of a device control instruction for a target device, whether the target device is registered in the electronic device, search for the target device among the at least one nearby device based on a determination that the target device is a device not registered in the electronic device, wherein the search for the target device is based on identification information of the target device obtained from the utterance and the information about the electronic device, and perform offline device registration of the target device by performing communication with a device found by the search.

The identification information of the target device may include at least one of device type information of the target device, and location information of the target device.

The information about the electronic device may include user identification information related to the electronic device.

The processor may be further configured to execute the at least one instruction to: perform speech recognition on the utterance to obtain a speech recognition result; and obtain the identification information of the target device by performing natural language processing on the speech recognition result.

The processor may be further configured to execute the at least one instruction to: search for the target device among the at least one nearby device by broadcasting data containing the identification information of the target device and the information about the electronic device to the at least one nearby device, and perform offline device registration of the target device based on response data transmitted by the at least one nearby device in response to the data.

Each of the at least one nearby device may be configured to: determine whether the nearby device corresponds to the target device based on device type information of the target device, user identification information related to the electronic device, and unique identification information of the target device, to generate response data; and transmit the response data to the electronic device.

Each of the at least one nearby device may be configured to: compare device type information of the target device with device type information of the nearby device; compare user identification information related to the electronic device with user identification information related to the nearby device, based on the device type information of the target device matching the device type information of the nearby device; request unique identification information of the target device from the electronic device, based on the user identification information related to the electronic device not matching the user identification information related to the nearby device; compare the unique identification information of the target device received from the electronic device with unique identification information of the nearby device; and transmit response data comprising information indicating that the nearby device corresponds to the target device to the electronic device, based on the unique identification information of the target device matching the unique identification information of the nearby device.

Each of the at least one nearby device may be configured to request the unique identification information of the target device from the electronic device, based on the user identification information related to the electronic device not matching the user identification information related to the nearby device, or the user identification information related to the nearby device is absent.

The processor may be further configured to execute the at least one instruction to: perform offline device registration of the target device based on location information of the target device and unique identification information of the target device; and transmit the device control instruction to the target device.

The target device may be configured to perform onboarding by transmitting information about the target device to an Internet of Things (IoT) server.

According to an aspect of the disclosure, a method of operating an electronic device includes: verifying, based on an utterance of a device control instruction for a target device, whether the target device is registered in the electronic device; searching for the target device among at least one nearby device located in a communication range of the electronic device based on identification information of the target device obtained from the utterance and the information about the electronic device, based on a determination that the target device is a device not registered in the electronic device; and performing offline device registration of the target device by communicating through a short-range wireless communication network with a device found by the search.

The identification information of the target device may include at least one of device type information of the target device, and location information of the target device.

The information about the electronic device may include user identification information related to the electronic device.

The method may further include: performing speech recognition on the utterance to obtain a speech recognition result; and obtaining the identification information of the target device by performing natural language processing on the speech recognition result.

The searching for the target device may include searching for the target device among the at least one nearby device by broadcasting data containing the identification information of the target device and the information about the electronic device to the at least one nearby device, and the performing of the device registration may include performing offline device registration of the target device based on response data transmitted by the at least one nearby device in response to the data.

The performing of the device registration may include: determining, by each of the nearby device devices, whether the nearby device corresponds to the target device based on device type information of the target device, user identification information related to the electronic device, and unique identification information of the target device; and transmitting, by each of the at least one nearby device, response data generated based on a determination result to the electronic device.

The performing the offline device registration may include: comparing, by each of the at least one nearby device, device type information of the target device with device type information of the nearby device; comparing, by each of the at least one nearby device, user identification information related to the electronic device with user identification information related to the nearby device, based on the device type information of the target device matching the device type information of the nearby device; requesting, by each of the at least one nearby device, unique identification information of the target device from the electronic device, based on the user identification information related to the electronic device not matching the user identification information related to the nearby device; comparing, by each of the at least one nearby device, the unique identification information of the target device received from the electronic device with unique identification information of the nearby device; and transmitting, by each of the at least one nearby device, response data comprising information indicating that the nearby device corresponds to the target device to the electronic device, based on the unique identification information of the target device matching the unique identification information of the nearby device.

The method may further include requesting, by each of the at least one nearby device, the unique identification information of the target device from the electronic device, based on the user identification information related to the electronic device not matching the user identification information related to the nearby device, or user identification information related to the nearby device is absent.

The performing the offline device registration may include: performing offline device registration of the target device based on location information of the target device and unique identification information of the target device; and transmitting the device control instruction to the target device.

The method may further include performing onboarding by transmitting information about the target device to an Internet of Things (IoT) server.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 13 is a flowchart illustrating an example of a method of operating an electronic device, according to an embodiment.

DETAILED DESCRIPTION

Figure 1:
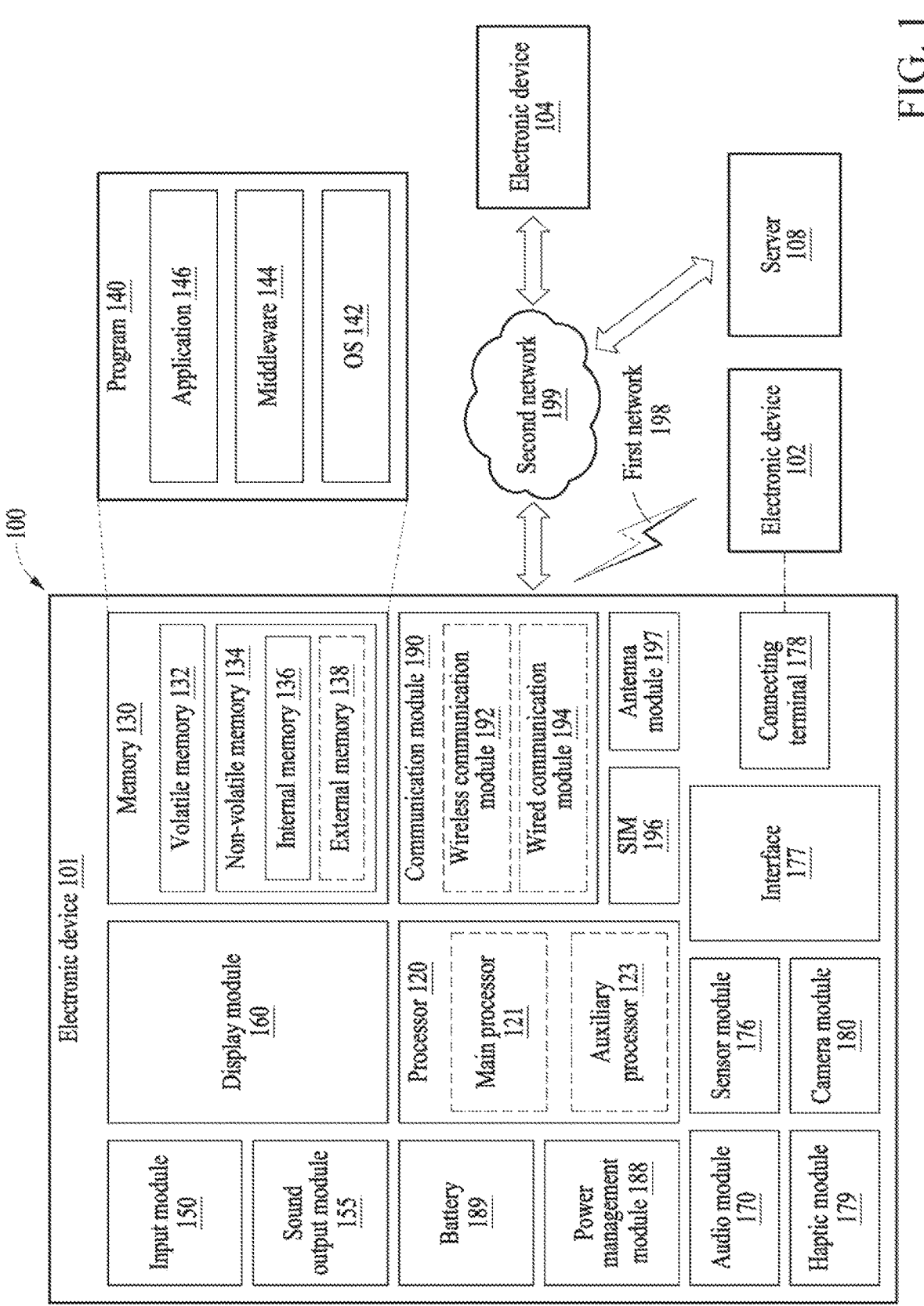
FIG. 1 is a block diagram illustrating an electronic device in a network environment, according to an embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123.

According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
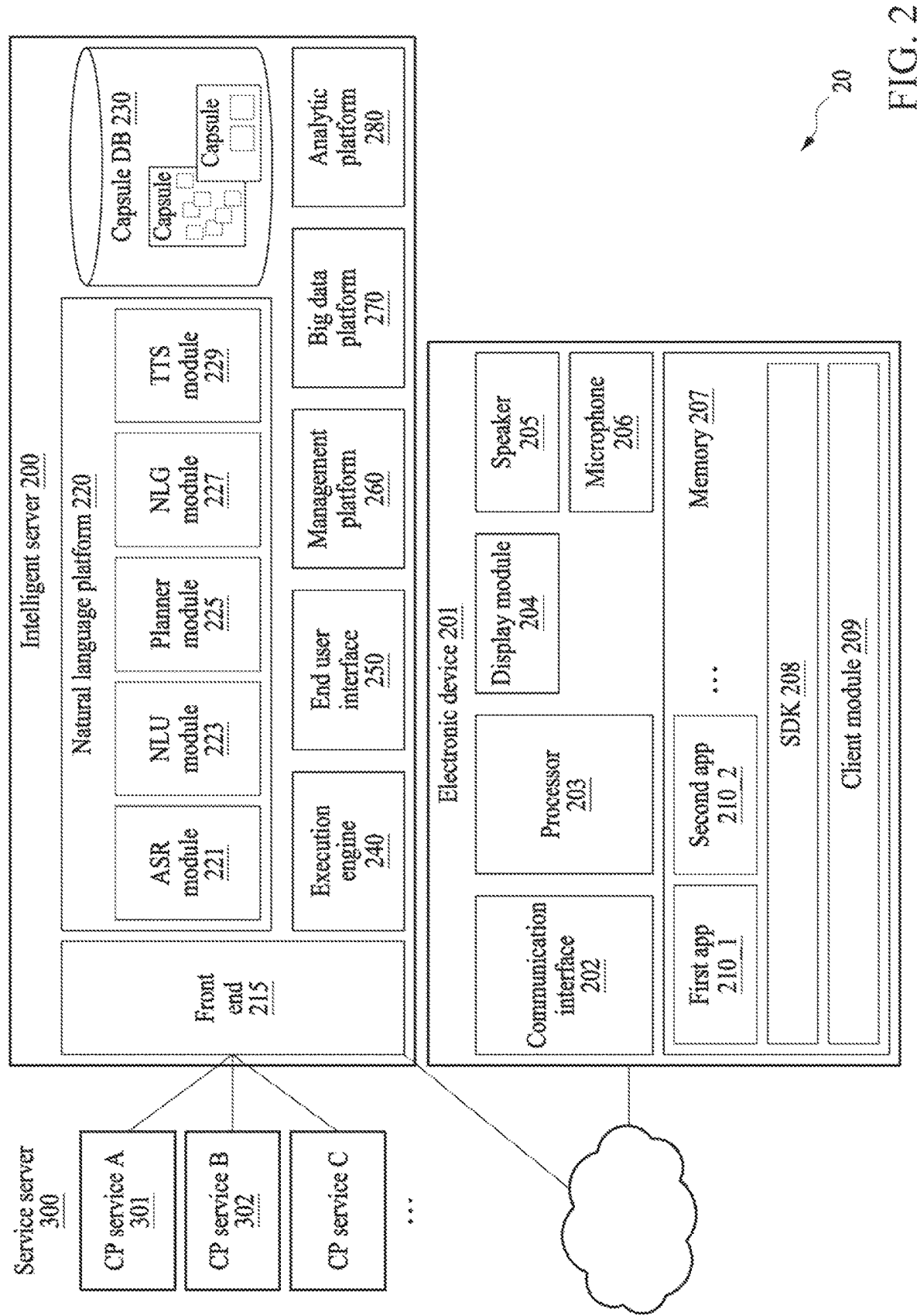
FIG. 2 is a block diagram illustrating an integrated intelligence system, according to an embodiment.

FIG. 2 is a block diagram illustrating an integrated intelligence system according to an embodiment.

Referring to FIG. 2, an integrated intelligence system 20 according to an embodiment may include an electronic device 201 (e.g., the electronic device 101 of FIG. 1), an intelligent server 200 (e.g., the server 108 of FIG. 1), and a service server 300 (e.g., the server 108 of FIG. 1).

The electronic device 201 may be a terminal device (or an electronic device) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown embodiment, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may be connected to an external device and configured to transmit and receive data to and from the external device. The microphone 206 may receive a sound (e.g., a user utterance) and convert the sound into an electrical signal. The speaker 205 may output the electrical signal as a sound (e.g., a speech).

The display module 204 may be configured to display an image or video. The display module 204 may also display a graphical user interface (GUI) of an app (or an application program) being executed.

The memory 207 may store a client module 209, a software development kit (SDK) 208, and a plurality of apps 210. The client module 209 and the SDK 208 may configure a framework (or a solution program) for performing general-purpose functions. In addition, the client module 209 or the SDK 208 may configure a framework for processing a user input (e.g., a voice input or a text input).

The plurality of apps 210 stored in the memory 207 may be programs for performing designated functions. According to an embodiment, the plurality of apps 210 may include a first app 210_1, a second app 210_2, and the like. According to an embodiment, each of the plurality of apps 210 may include a plurality of actions for performing a designated function. For example, the apps may include an alarm app, a messaging app, and/or a scheduling app. According to an embodiment, the plurality of apps 210 may be executed by the processor 203 to sequentially execute at least a portion of the plurality of actions.

The processor 203 may control the overall operation of the electronic device 201. For example, the processor 203 may be electrically connected to the communication interface 202, the microphone 206, the speaker 205, and the display module 204 to perform a designated operation.

The processor 203 may also perform the designated function by executing the program stored in the memory 207. For example, the processor 203 may execute at least one of the client module 209 or the SDK 208 to perform the following operation for processing a user input. The processor 203 may control the operation of the plurality of apps 210 through, for example, the SDK 208. The following operation which is the operation of the client module 209 or the SDK 208 may be performed by the processor 203.

The client module 209 may receive a user input. For example, the client module 209 may receive a voice signal corresponding to a user utterance sensed through the microphone 206. The client module 209 may transmit the received user input to the intelligent server 200. The client module 209 may transmit state information of the electronic device 201 together with the received user input to the intelligent server 200. The state information may be, for example, execution state information of an app.

The client module 209 may receive a result corresponding to the received user input. For example, when the intelligent server 200 is capable of calculating a result corresponding to the received user input, the client module 209 may receive the result corresponding to the received user input. The client module 209 may display the received result on the display module 204. Further, the client module 209 may output the received result in an audio form through the speaker 205.

The client module 209 may receive a plan corresponding to the received user input. The client module 209 may display results of executing a plurality of actions of an app according to the plan on the display module 204. For example, the client module 209 may sequentially display the results of executing the plurality of actions on the display module 204 and output the results in an audio form through the speaker 205. As another example, the electronic device 201 may display only a portion of the results of executing the plurality of actions (e.g., a result of the last action) on the display module 204 and output the portion of the results in an audio form through the speaker 205.

According to an embodiment, the client module 209 may receive a request for obtaining information necessary for calculating a result corresponding to the user input from the intelligent server 200. According to an embodiment, the client module 209 may transmit the necessary information to the intelligent server 200 in response to the request.

The client module 209 may transmit information on the results of executing the plurality of actions according to the plan to the intelligent server 200. The intelligent server 200 may confirm that the received user input has been correctly processed using the information on the results.

The client module 209 may include a speech recognition module. According to an embodiment, the client module 209 may recognize a voice input for performing a limited function through the speech recognition module. For example, the client module 209 may execute an intelligent app for processing a voice input to perform an organic operation through a designated input (e.g., Wake up!).

The intelligent server 200 may receive information related to a user voice input from the electronic device 201 through a communication network. According to an embodiment, the intelligent server 200 may change data related to the received voice input into text data. According to an embodiment, the intelligent server 200 may generate a plan for performing a task corresponding to the user voice input based on the text data.

According to an embodiment, the plan may be generated by an artificial intelligence (AI) system. The artificial intelligence system may be a rule-based system or a neural network-based system (e.g., a feedforward neural network (FNN) or a recurrent neural network (RNN)). Alternatively, the artificial intelligence system may be a combination thereof or other artificial intelligence systems. According to an embodiment, the plan may be selected from a set of predefined plans or may be generated in real time in response to a user request. For example, the artificial intelligence system may select at least one plan from among the predefined plans.

The intelligent server 200 may transmit a result according to the generated plan to the electronic device 201 or transmit the generated plan to the electronic device 201. According to an embodiment, the electronic device 201 may display the result according to the plan on the display module 204. According to an embodiment, the electronic device 201 may display a result of executing an action according to the plan on the display module 204.

The intelligent server 200 may include a front end 215, a natural language platform 220, a capsule database (DB) 230, an execution engine 240, an end user interface 250, a management platform 260, a big data platform 270, or an analytic platform 280.

The front end 215 may receive the received user input from the electronic device 201. The front end 215 may transmit a response corresponding to the user input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 201 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent.

The planner module 225 may generate a plan using a parameter and the intent determined by the NLU module 223. According to an embodiment, the planner module 225 may determine a plurality of domains required to perform a task based on the determined intent. The planner module 225 may determine a plurality of actions included in each of the plurality of domains determined based on the intent. According to an embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) on connections between the plurality of actions and the plurality of concepts. The planner module 225 may generate the plan using information stored in the capsule DB 230 which stores a set of relationships between concepts and actions.

The NLG module 227 may change designated information into a text form. The information changed to the text form may be in the form of a natural language utterance. The TTS module 229 may change information in a text form into information in a speech form.

According to an embodiment, some or all of the functions of the natural language platform 220 may be implemented in the electronic device 201 as well.

The capsule DB 230 may store information on the relationship between the plurality of concepts and actions corresponding to the plurality of domains. A capsule according to an embodiment may include a plurality of action objects (or action information) and concept objects (or concept information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the user input. According to an embodiment, the capsule DB 230 may include a follow-up registry that stores information on follow-up actions for suggesting a follow-up action to the user in a designated situation. The follow-up action may include, for example, a follow-up utterance. According to an embodiment, the capsule DB 230 may include a layout registry that stores layout information that is information output through the electronic device 201. According to an embodiment, the capsule DB 230 may include a vocabulary registry that stores vocabulary information included in capsule information. According to an embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an embodiment, the capsule DB 230 may be implemented in the electronic device 201 as well.

The execution engine 240 may calculate a result using the generated plan. The end user interface 250 may transmit the calculated result to the electronic device 201. Accordingly, the electronic device 201 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., food order or hotel reservation) to the electronic device 201. According to an embodiment, the service server 300 may be a server operated by a third party. The service server 300 may provide information to be used for generating a plan corresponding to the received user input to the intelligent server 200. The provided information may be stored in the capsule DB 230. In addition, the service server 300 may provide result information according to the plan to the intelligent server 200.

In the integrated intelligence system 20 described above, the electronic device 201 may provide various intelligent services to the user in response to a user input. The user input may include, for example, an input through a physical button, a touch input, or a voice input.

In an embodiment, the electronic device 201 may provide a speech recognition service through an intelligent app (or a speech recognition app) stored therein. In this case, for example, the electronic device 201 may recognize a user utterance or a voice input received through the microphone, and provide a service corresponding to the recognized voice input to the user.

In an embodiment, the electronic device 201 may perform a designated action alone or together with the intelligent server and/or a service server, based on the received voice input. For example, the electronic device 201 may execute an app corresponding to the received voice input and perform a designated action through the executed app.

In an embodiment, when the electronic device 201 provides a service together with the intelligent server 200 and/or the service server 300, the electronic device 201 may detect a user utterance using the microphone 206 and generate a signal (or voice data) corresponding to the detected user utterance. The electronic device 201 may transmit the voice data to the intelligent server 200 using the communication interface 202.

The intelligent server 200 may generate, as a response to the voice input received from the electronic device 201, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 201 may receive the response using the communication interface 202. The electronic device 201 may output a voice signal internally generated by the electronic device 201 to the outside using the speaker 205, or output an image internally generated by the electronic device 201 to the outside using the display module 204.

Figure 3:
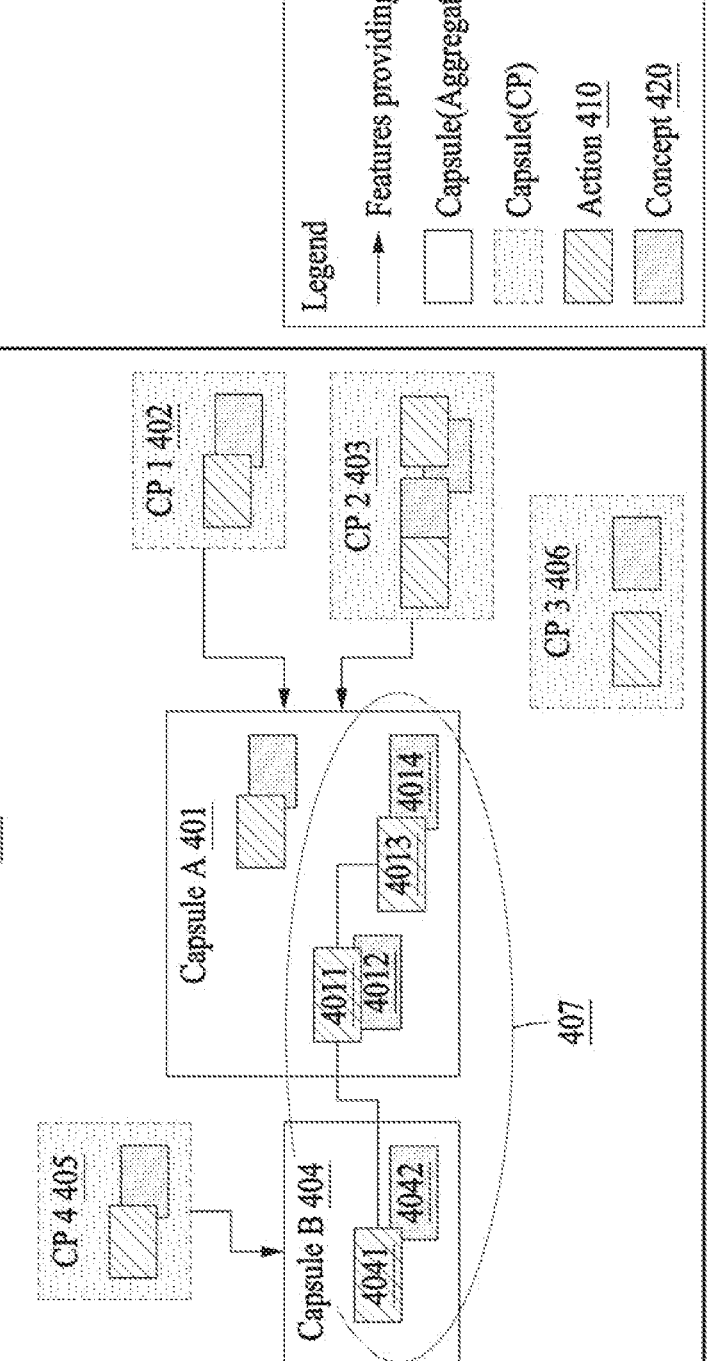
FIG. 3 is a diagram illustrating a form in which relationship information between concepts and actions is stored in a database, according to an embodiment.

FIG. 3 is a diagram illustrating a form in which relationship information between concepts and actions is stored in a database according to an embodiment.

A capsule DB (e.g., the capsule DB 230) of the intelligent server 200 may store capsules in the form of a concept action network (CAN) 400. The capsule DB may store an action for processing a task corresponding to a voice input of a user and a parameter required for the action in the form of a CAN.

The capsule DB may store a plurality of capsules (a capsule A 401 and a capsule B 404) respectively corresponding to a plurality of domains (e.g., applications). According to an embodiment, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to an embodiment, one capsule may include at least one action 410 for performing a designated function and at least one concept 420.

The natural language platform 220 may generate a plan for performing a task corresponding to the received voice input using the capsules stored in the capsule DB. For example, the planner module 225 of the natural language platform 220 may generate the plan using the capsules stored in the capsule DB. For example, a plan 407 may be generated using actions 4011 and 4013 and concepts 4012 and 4014 of the capsule A 401 and an action 4041 and a concept 4042 of the capsule B 404.

Figure 4:
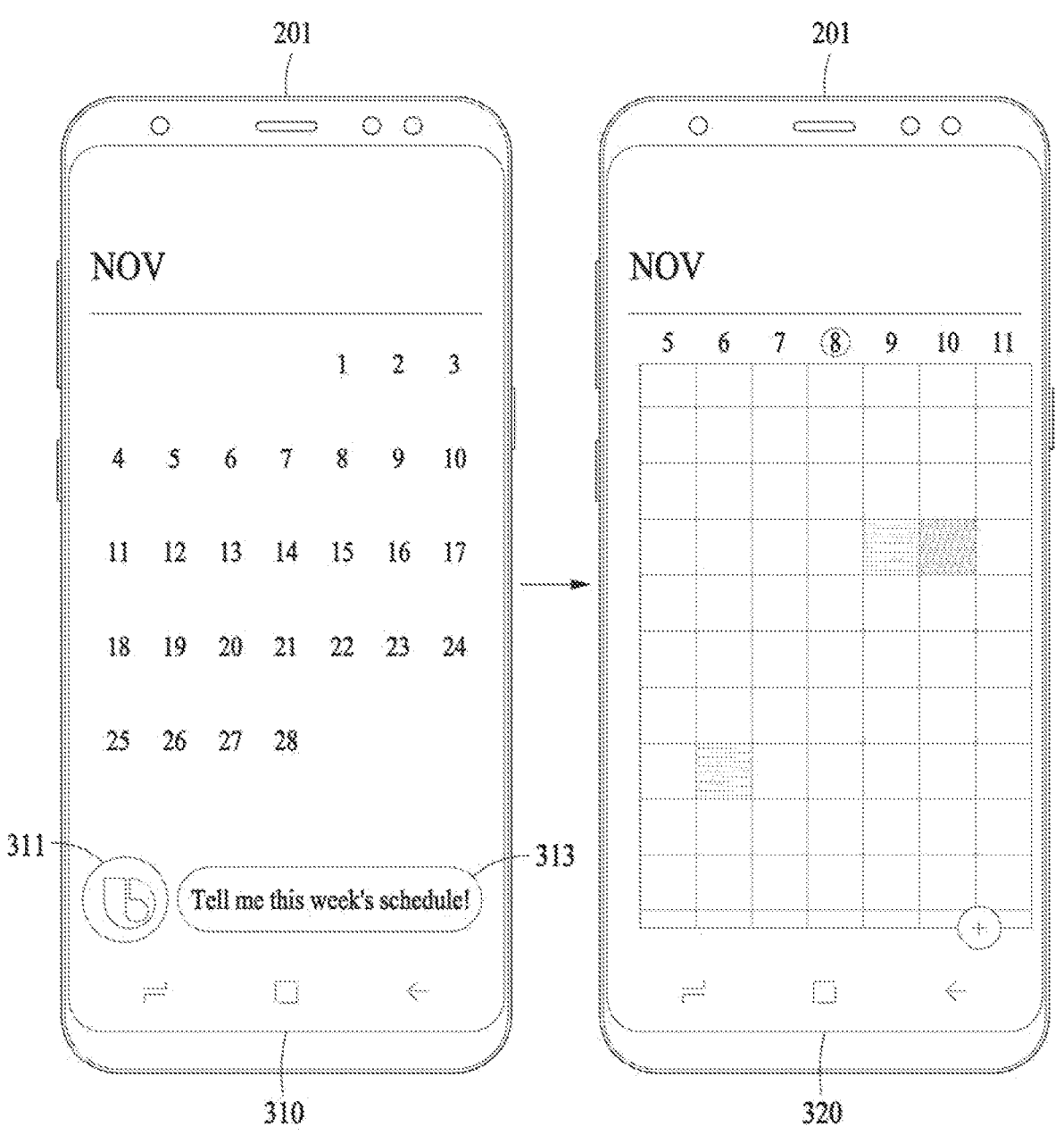
FIG. 4 is a diagram illustrating a screen of an electronic device processing a received voice input through an intelligent app, according to an embodiment.

FIG. 4 is a diagram illustrating a screen of an electronic device processing a received voice input through an intelligent app according to an embodiment.

The electronic device 201 may execute an intelligent app to process a user input through the intelligent server 200.

According to an embodiment, on a screen 310, when a designated voice input (e.g., Wake up!) is recognized or an input through a hardware key (e.g., a dedicated hardware key) is received, the electronic device 201 may execute an intelligent app for processing the voice input. The electronic device 201 may execute the intelligent app, for example, in a state in which a scheduling app is executed. According to an embodiment, the electronic device 201 may display an object (e.g., an icon) 311 corresponding to the intelligent app on the display module 204. According to an embodiment, the electronic device 201 may receive a voice input by a user utterance. For example, the electronic device 201 may receive a voice input of "Tell me this week's schedule!". According to an embodiment, the electronic device 201 may display a user interface (UI) 313 (e.g., an input window) of the intelligent app in which text data of the received voice input is displayed on the display module 204.

According to an embodiment, on a screen 320, the electronic device 201 may display a result corresponding to the received voice input on the display module 204. For example, the electronic device 201 may receive a plan corresponding to the received user input, and display "this week's schedule" on the display module 204 according to the plan.

Figure 5:
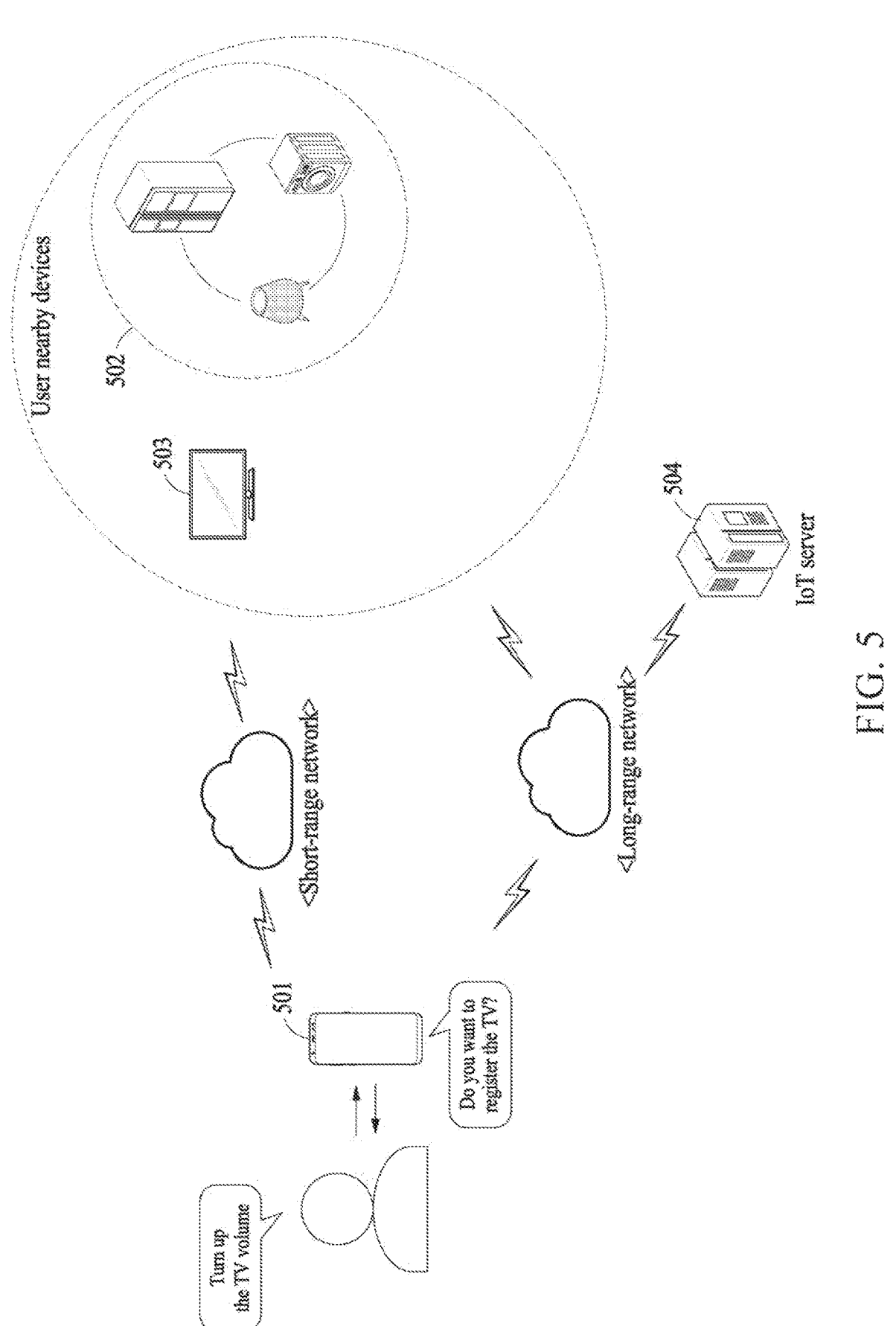
FIG. 5 is a diagram illustrating a device registration operation performed offline by an electronic device, according to an embodiment.

FIG. 5 is a diagram illustrating a device registration operation performed offline by an electronic device according to an embodiment.

Referring to FIG. 5, according to an embodiment, an electronic device 501 may be connected to user nearby devices 502 and 503 through a short-range wireless communication network. The electronic device 501, the user nearby devices 502 and 503, and an IoT server 504 may be interconnected through a long-range wireless communication network. The electronic device 501 may correspond to the electronic device described in FIG. 1 (e.g., the electronic device 101 of FIG. 1). The user nearby devices 502 and 503 may correspond to the electronic devices described in FIG. 1 (e.g., the electronic devices 102 and 104 of FIG. 1). The short-range wireless communication network may correspond to the first network described in FIG. 1 (e.g., the first network 198 of FIG. 1) (e.g., a short-range communication network such as Bluetooth, wireless fidelity (WiFi) direct, or infrared data association (IrDA)). The long-range wireless communication network may correspond to the second network described in FIG. 1 (e.g., the second network 199 of FIG. 1) (e.g., a long-range wireless communication network such as a legacy cellular network, a fifth-generation (5G) network, a next-generation communication network, the Internet, or a computer network (e.g., a local area network (LAN) or a wide area network (WAN)). Therefore, a duplicated description of such described in FIG. 1 will be omitted.

According to an embodiment, the devices 501, 502, and 503 may be implemented as at least one of smartphones, tablet personal computers (PCs), mobile phones, speakers (e.g., artificial intelligence (AI) speakers), video phones, e-book readers, desktop PCs, laptop PCs, netbook computers, workstations, servers, personal digital assistants (PDAs), portable multimedia players (PMPs), MP3 players, mobile medical devices, cameras, or a wearable devices. Further, the devices 501, 502, and 503 may be home appliances. For example, the home appliances may include at least one of televisions, digital video disk (DVD) players, audio systems, refrigerators, air conditioners, vacuum cleaners, ovens, microwave ovens, washing machines, air purifiers, set-top boxes, home automation control panels, security control panels, game consoles, electronic keys, camcorders, or electronic photo frames.

According to an embodiment, the devices 501, 502, and 503 may be owned devices owned by a user. The electronic device 501 may be a receiving device that receives an utterance (e.g., an instruction) of the user. The user nearby devices 502 and 503 may be nearby devices located around the electronic device 501. When the utterance of the user is a device control utterance (e.g., a remote device control utterance) for controlling an electronic device other than the electronic device 501, the target device 503 may be a device that is a target of the device control utterance. The target device 503 may be an execution device that executes an instruction from a user. Although FIG. 5 separately illustrates the electronic device 501, the nearby device 502 excluding the target device, and the target device 503 for ease of description, any one of the target device 503 or the nearby device 502 excluding the target device may be a receiving device, and the electronic device 501 or any one of the nearby devices 502 and 503 may be a target device 503.

According to an embodiment, the IoT server 504 may obtain, store, and manage device information (e.g., device type information, device location information, device unique identification information, function performance capability information, and device state information) about the devices owned by the user (e.g., the devices 501, 502, and 503). The devices 501, 502, and 503 may be devices pre-registered in the IoT server 602 in relation to account information of the user (e.g., a user ID).

According to an embodiment, among the device information, the device type information may be information about a device type (e.g., TV, air conditioner, vacuum cleaner). Among the device information, the location information (e.g., registered location information) may be information indicating the location (e.g., registered location) of the device, and may include a name of a place where the device is located and/or a location coordinate value indicating the location of the device. For example, the location information of the device may include a name indicating a designated place in a house, such as a room or a living room. As another example, the location information of the device may include a name of a place such as a home or an office. As still another example, the location information of the device may include geofence information. Among the device information, the device unique identification information may be a series of unique information allocated to the device for identifying the device. For example, the device unique identification information may include a serial number of the device, a PIN of the device, and the like. Among the device information, the function performance capability information may be information about a function of the device that is predefined to perform an operation. For example, when the device is a TV, the function performance capability information of the TV may indicate a function such as volume up, volume down, or channel change. Among the device information, the device state information may be, for example, information indicating a current state of the device including at least one of power on/off information and operation information on an operation that is currently executed.

According to an embodiment, the IoT server 504 may obtain, determine, or generate a control instruction to control a device based on the stored device information. The IoT server 504 may transmit a control instruction to a device determined to perform an operation based on the operation information. The IoT server 504 may receive a result of performing the operation according to the control instruction from the device that has performed the operation. The IoT server 504 may be configured as a hardware device independent from an intelligent server (e.g., the intelligent server 200 of FIG. 2), but is not limited thereto. The IoT server 504 may be a component of the intelligent server (e.g., the intelligent server 200 of FIG. 2) or may be a server designed to be classified by software.

According to an embodiment, the electronic device 501 may perform offline device registration of the target device 503. Offline device registration may be registering the target device 503 in the electronic device 501 (e.g., a device control application (SmartThings) stored in the electronic device 501) in an offline situation. Through device registration, information about the target device 503 may be stored in an owned device list included in a memory of the electronic device 501. The target device 503 may perform onboarding (e.g., online device registration) by transmitting the information about the target device 503 to the IoT server 504 through the long-range wireless communication network (e.g., the second network 199 of FIG. 1). That is, the target device 503 to be controlled may be an electronic device for which device registration has not been performed in an online and/or offline situation, and the target device for which device registration has not been performed may have only device type information and device unique identification information (e.g., a serial number or a PIN).

According to an embodiment, the electronic device 501 may receive an utterance (e.g., Turn up the TV volume) from the user. When the utterance is a device control instruction for the target device 503 to be controlled (e.g., a TV), the electronic device 501 may verify whether the target device 503 is registered in the electronic device 501 (e.g., the device control application stored in the electronic device 501). If the target device 503 is a device that is not registered in the electronic device 501, the electronic device 501 may search for the target device 503 among the nearby devices 502 and 503 based on identification information (e.g., device type (e.g., TV) information) of the target device, which is obtained based on the utterance, and the pre-stored information about the electronic device 501 (e.g., user identification information for identifying the user of the electronic device 501). The electronic device 501 may inquire whether the user has the intention to register the device (e.g., utter "Do you want to register the TV?"), and perform offline device registration of the target device 503 by communicating with found devices 502 and 503 through the short-range wireless communication network (e.g., the first network 198 of FIG. 1).

According to an embodiment, the electronic device 501 may provide a simplified device registration procedure by using identification information of a target device obtained by natural language processing of a user utterance and pre-stored user identification information. The electronic device 501 may perform device registration of the target device 503 even in an offline situation by performing communication with the nearby devices 502 and 503 through the short-range wireless communication network (e.g., the first network 198 of FIG. 1). The electronic device 501 may control even a target device 503 that is not registered in the device control application in an offline situation. When the target device 503 is connected online, the target device 503 may perform a simplified onboarding (e.g., online device registration) procedure by using information exchanged during the offline device registration procedure.

Figure 6A:
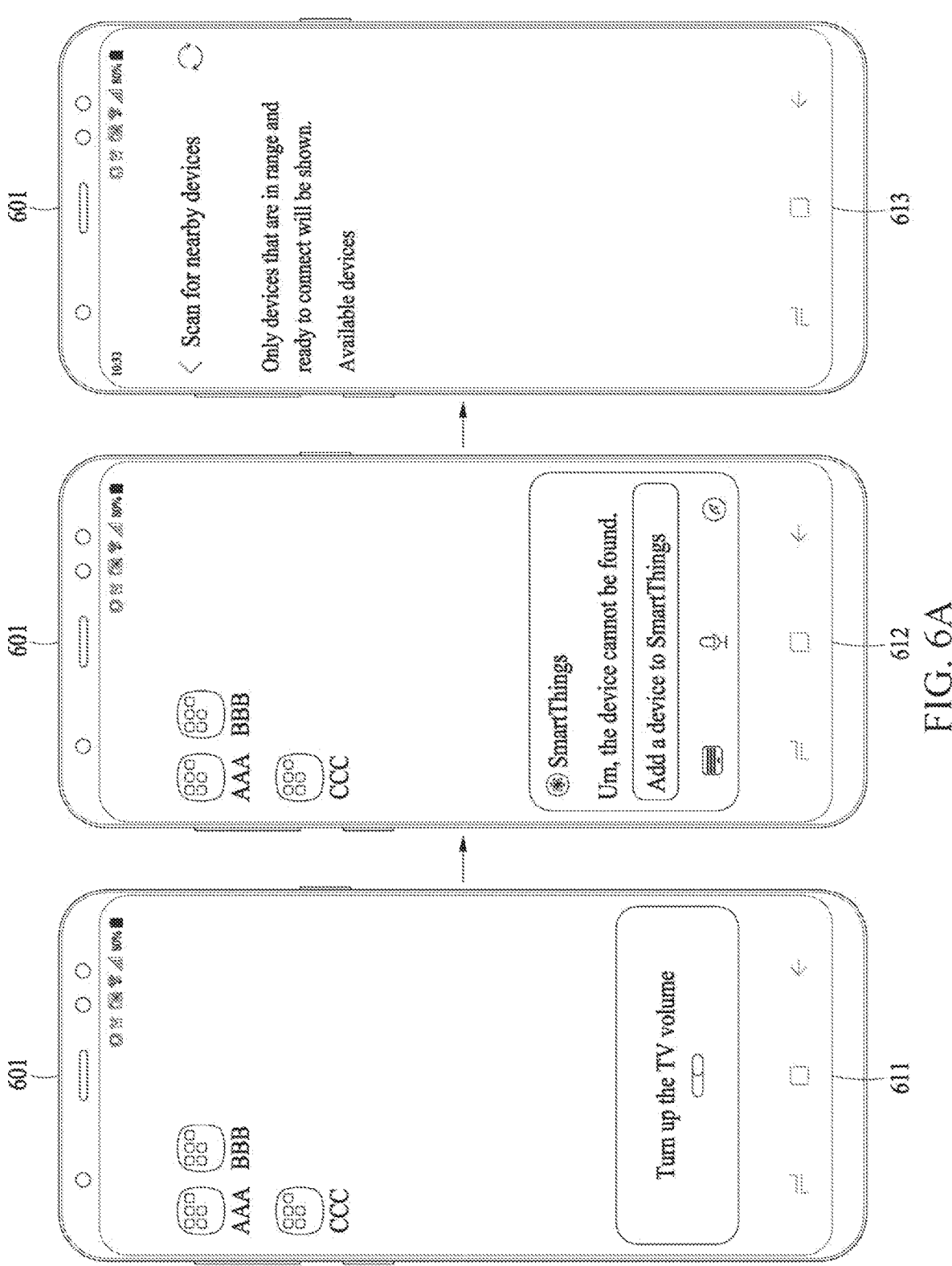
FIGS. 6A, 6B, and 6C are diagrams illustrating an onboarding operation performed by an electronic device, according to an embodiment.
Figure 6B:
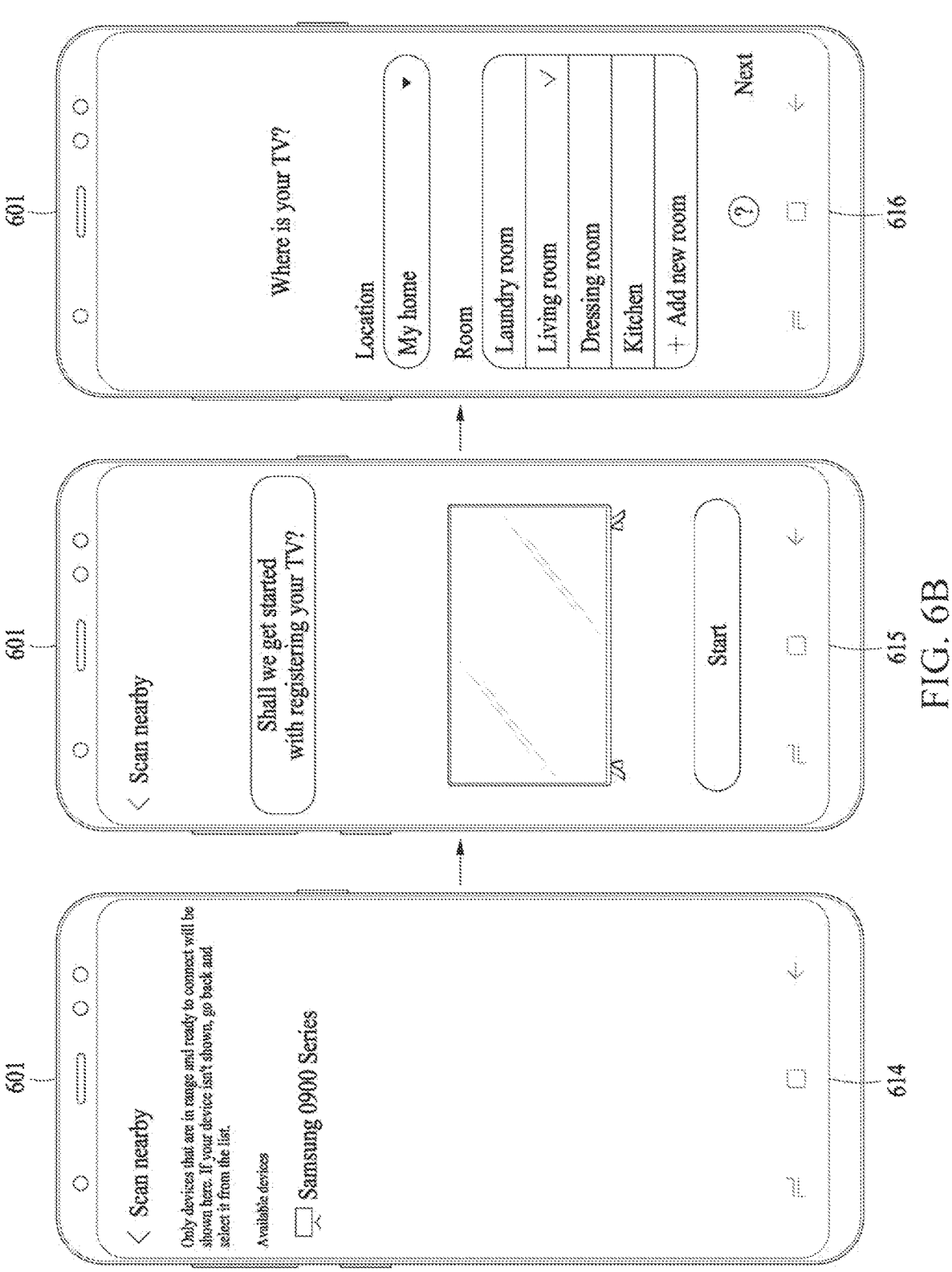
Figure 6C:
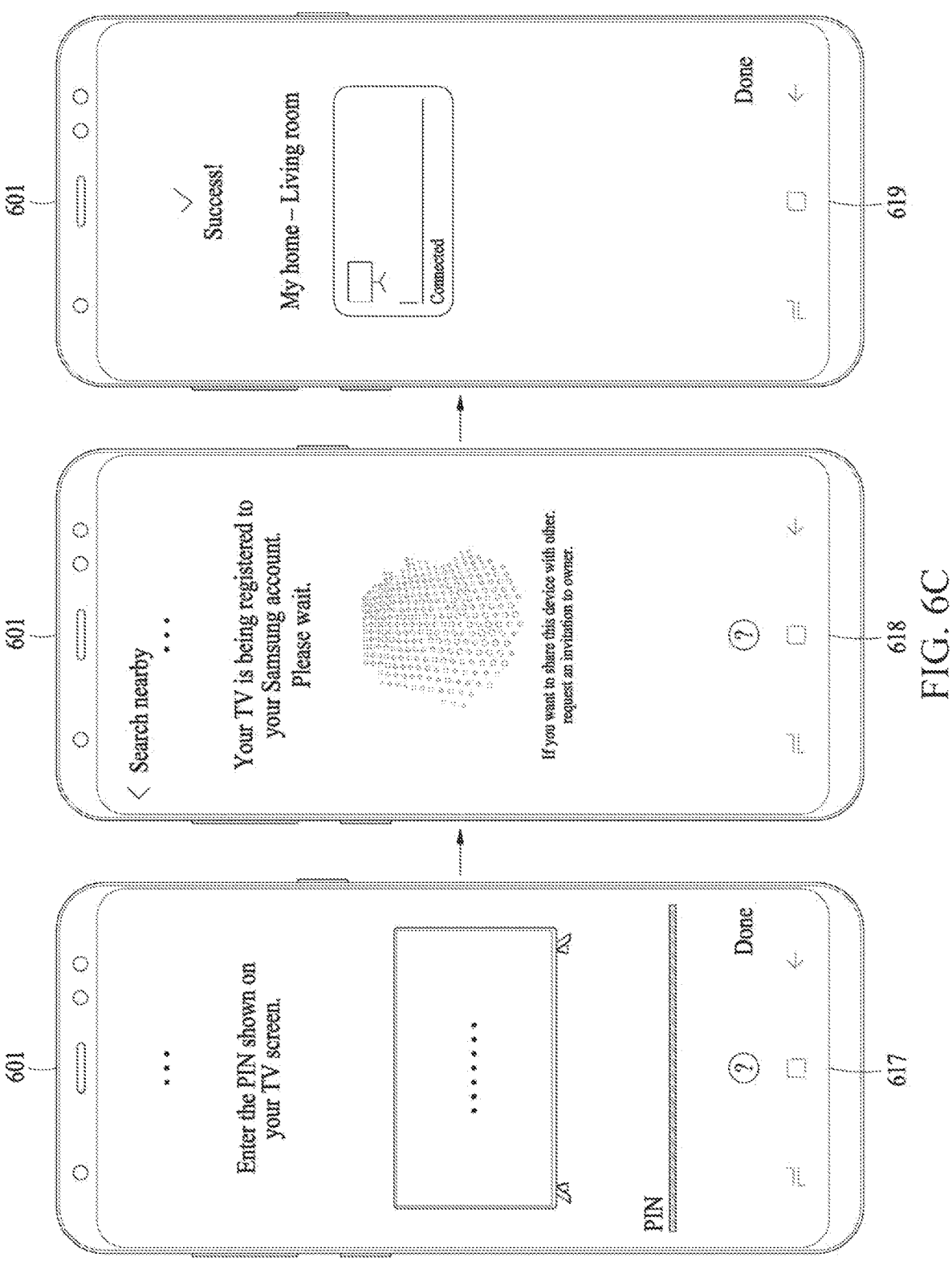

FIGS. 6A, 6B, and 6C are diagrams illustrating an onboarding operation performed by an electronic device.

Referring to FIG. 6A, an electronic device 601 may receive an utterance (e.g., "Turn up the TV volume") from a user and display a UI of a voice assistant through a screen 611. The electronic device 601 may search whether the TV is a device onboard a device control application, and display search results (e.g., TV is not an onboarding device and cannot be found) and a UI inquiring whether to register a new IoT device (e.g., TV) in the device control application through a screen 612. When the user determines to add a device, the electronic device 601 may perform a nearby device search and display a UI of the voice assistant performing a search through a screen 613.

Referring to FIG. 6B, the electronic device 601 may display a nearby device search result (e.g., an available device: Samsung Q900 Series) through a screen 614. When the user wants device registration of the found TV, the electronic device 601 may display a UI notifying the start of the onboarding procedure through a screen 615. When the user starts the onboarding procedure, the electronic device 601 may display a UI for receiving location information of the TV through a screen 616.

Referring to FIG. 6C, the electronic device 601 receiving the location information of the TV from the user may display a UI for receiving unique identification information (e.g., a PIN) of the TV through a screen 617. The electronic device 601 may determine whether the TV is a controllable device by comparing the unique identification information received from the user with the unique identification information registered in the IoT server. The electronic device 601 may display a UI informing that onboarding of the TV has been successfully performed through a screen 619. The above-described onboarding operation of the electronic device 601 takes a lot of time (e.g., the time required for searching for nearby devices and the time required for communicating with the IoT server), and requires a plurality of user inputs (e.g., a user input for selecting a device to be registered from among found nearby devices, a user input for providing location information of the device to be registered, and a user input for providing unique identification information of the device to be registered). In addition, the onboarding operation may be performed only online for communication with the IoT server.

Figure 7:
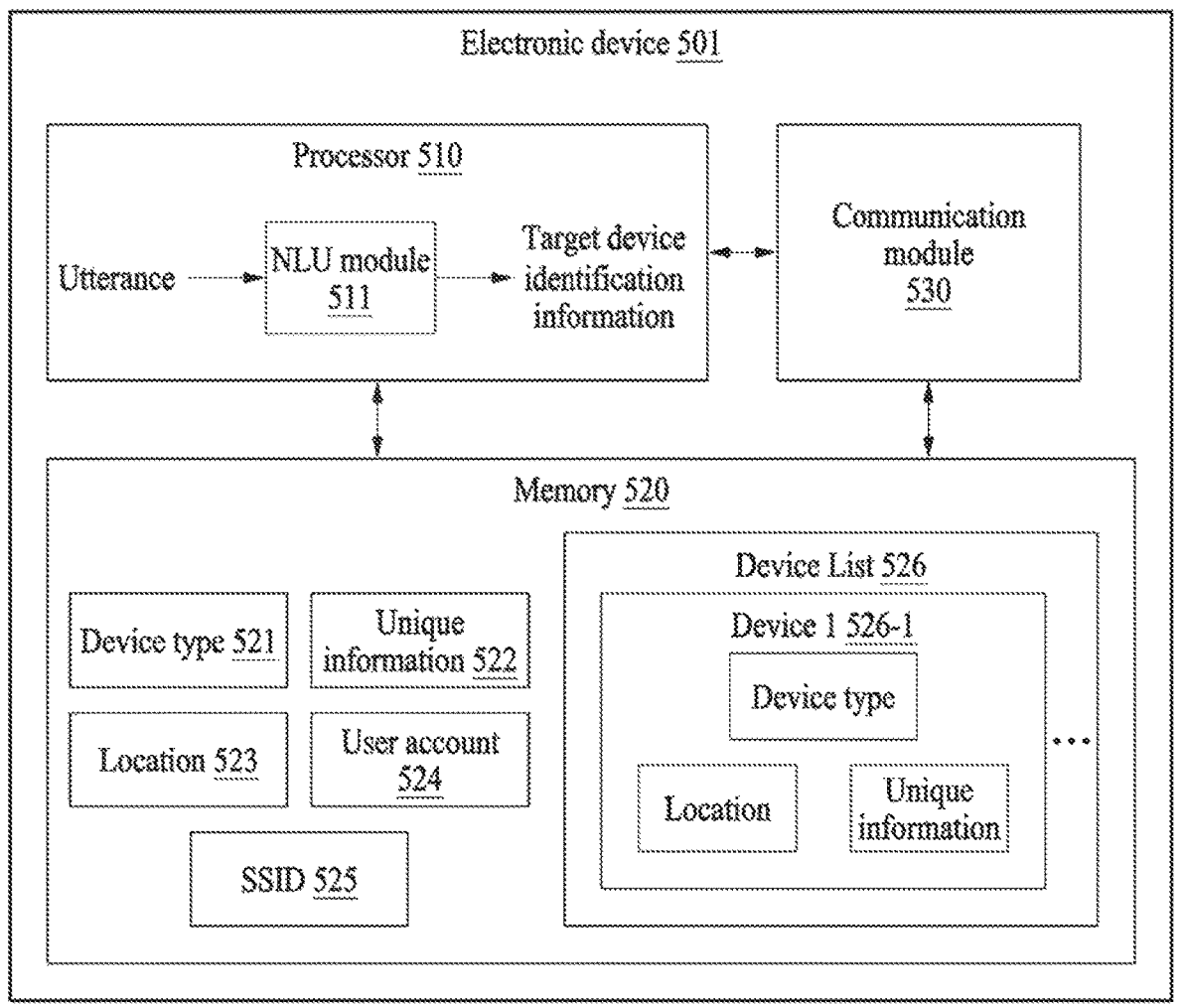
FIG. 7 is a schematic block diagram of an electronic device, according to an embodiment.

FIG. 7 is a schematic block diagram of an electronic device according to an embodiment.

Referring to FIG. 7, according to an embodiment, the electronic device 501 may perform simplified device registration of a target device. Also, the electronic device 501 may perform offline device registration of the target device. Offline device registration may be registering a target device in the electronic device 501 (e.g., a device control application (e.g., SmartThings) stored in the electronic device 501) in an offline situation. Through device registration, information about the target device may be stored in an owned device list 526 included in a memory 520 of the electronic device 501. The electronic device 501 may also perform natural language processing. The electronic device 501 may include a processor 510, the memory 520, and a communication module 530, and the electronic device 501 may correspond to the electronic device described in FIG. 1 (e.g., the electronic device 101 of FIG. 1). Therefore, a duplicated description of such described in FIG. 1 will be omitted.

According to an embodiment, the processor 510 may perform natural language processing. The processor 510 may perform speech recognition on a user utterance, and obtain identification information of the target device by performing natural language processing on a speech recognition result. The processor 510 may perform natural language processing on the user utterance through a natural language understanding (NLU) module 511. The NLU module 511 may correspond to the NLU module described in FIG. 2 (e.g., the NLU module 223 of FIG. 2) implemented on the electronic device 501. The NLU module 511 may discern the intent of the user by performing syntactic analysis or semantic analysis on a user input in the form of text data. The processor 510 may determine whether the utterance (e.g., an utterance converted in the form of text data) is a target device control instruction using the NLU module 511, and obtain identification information of the target device (e.g., device type information of the target device and location information of the target device) from the utterance. The electronic device 501 may perform natural language processing through the on-device NLU module 511. Alternatively, the electronic device 501 may perform natural language processing through the intelligent server 200 described in FIG. 2.

According to an embodiment, when the utterance is a device control instruction for the target device to be controlled, the processor 510 may verify whether the target device is registered in the electronic device 501 (e.g., the device control application stored in the electronic device 501). In other words, the processor 510 may verify whether the target device is included in the owned device list 526 included in the memory 520 of the electronic device 501.

According to an embodiment, if the target device is a device that is not registered in the electronic device 501, the processor 510 may search for the target device among nearby devices based on identification information of the target device, which is obtained based on the utterance, and the pre-stored information about the electronic device 501 (e.g., user identification information for identifying the user of the electronic device 501 (e.g., user account information 524)). The processor 510 may search for the target device among the nearby devices by broadcasting data containing the identification information of the target device and the information about the electronic device 501 to the nearby devices.

According to an embodiment, the processor 510 may perform offline device registration of the target device by communicating with a found device through a short-range wireless communication network (e.g., the first network 198 of FIG. 1). The processor 510 may perform offline device registration of the target device based on response data transmitted by the nearby devices in response to the broadcast data. The processor 510 may perform offline device registration of the target device based on location information of the target device (e.g., location information of the target device obtained based on a device control utterance, location information of the target device stored in the target device, or location information of the target device requested and received from the user) and unique identification information of the target device. The operation of performing offline device registration by the processor 510 will be described in detail with reference to FIG. 8.

According to an embodiment, the target device may perform onboarding (e.g., online device registration) by transmitting the information about the target device to an IoT server 504 (e.g., the IoT server 504 of FIG. 5) through a long-range wireless communication network (e.g., the second network 199 of FIG. 1). The operation of registering the offline registered device online will be described in detail with reference to FIG. 9.

According to an embodiment, the memory 520 may include information about the electronic device 501. For example, the information about the electronic device 501 may include device type information 521, device unique identification information 522, device location information 523, the user account information 524, and/or service set identifier (SSID) information 525. The memory 520 may include the owned device list 526 (e.g., the owned device list generated by the device control application (e.g., Smart-Things)). The device control application may be stored as software in the memory 520. The owned device list 526 may include information about devices that are controllable through the device control application (e.g., device type information, device location information, and device unique identification information). The processor 510 may control devices included in the owned device list 526 through the device control application.

The communication module 530 may support the establishment of a direct (e.g., wired) communication channel or a wireless communication channel between external devices (e.g., a nearby device, a target device, and an IoT server) of the electronic device 501. The communication module 530 may support the communication through the established communication channel.

Figure 8:
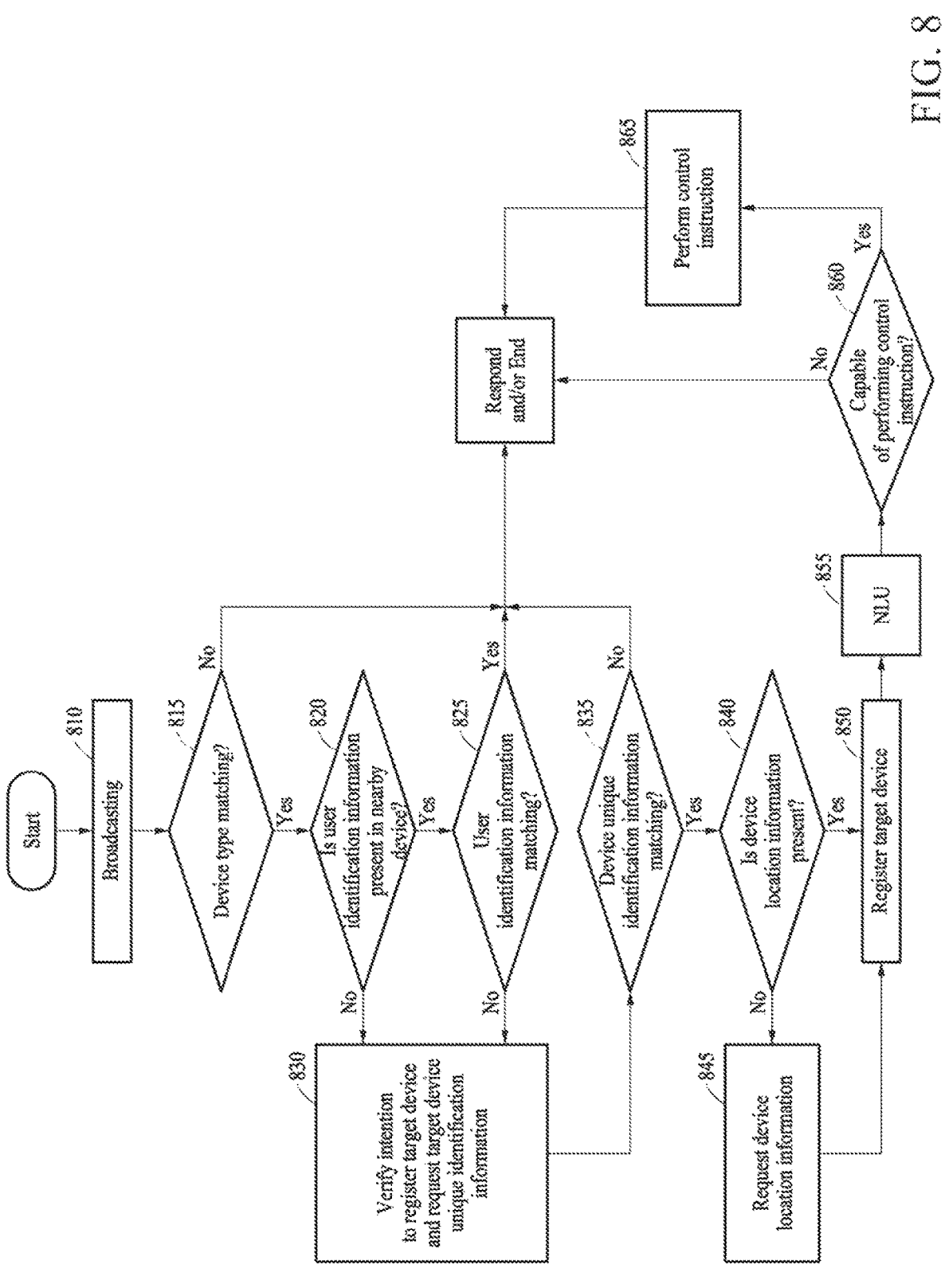
FIG. 8 is a flowchart of an offline device registration operation, according to an embodiment.

FIG. 8 is a flowchart of an offline device registration operation according to an embodiment.

Operations 810 through 865 may be performed sequentially, but not be necessarily performed sequentially. For example, the order of operations 810 through 865 may be changed, and at least two of operations 810 through 865 may be performed in parallel. Hereinafter, it will be described on the premise that a target device to be controlled (e.g., the target device 503 of FIG. 5) has never been registered in (or onboard) the electronic device 501 in an online and/or offline situation and that the target device 503 has device type information and device unique identification information (e.g., a serial number or a PIN).

In operation 810, an electronic device (e.g., the electronic device 501 of FIG. 5) may perform broadcasting. The electronic device 501 may search for a target device 503 among nearby devices (e.g., the nearby devices 502 and 503 of FIG. 5) by broadcasting data containing identification information of the target device 503 and information about the electronic device 501 to the nearby devices 502 and 503. The identification information of the target device 503 may include device type information of the target device 503 obtained by performing natural language processing on an utterance (e.g., an utterance including a device control instruction for the target device 503) and/or location information of the target device 503. The location information may be information indicating the location (e.g., registered location) of the device, and may include a name of a place where the device is located and/or a location coordinate value indicating the location of the device. For example, the location information of the device may include a name indicating a designated place in a house, such as a room or a living room. As another example, the location information of the device may include a name of a place such as a home or an office. The information about the electronic device 501 may be user identification information (e.g., user account information (e.g., userID) or a key value) for identifying the user of the electronic device 501, and may be pre-stored in the electronic device 501.

In operation 815, a found nearby device 502 or 503 may compare the device type information of the target device 503 with device type information of the nearby device 502 or 503. If the found nearby device 502 or 503 is a device of a different type from the target device 503, a device registration algorithm may be terminated because it does not need to be performed anymore.

In operation 820, if the device type information of the target device 503 and the device type information of the nearby device 502 or 503 matches, the nearby device 502 or 503 may identify whether user identification information related to the nearby device 502 or 503 (e.g., user identification information for identifying a user of the nearby device 502 or 503) is stored in the nearby device 502 or 503. Through operation 820, it may be verified whether the nearby device 502 or 503 is a device for which device registration has been performed (e.g., whether a user who has performed device registration to control the nearby device 502 or 503 exists).

In operation 825, the nearby device 502 or 503 storing the user identification information may compare user identification information related to the electronic device 501 (e.g., user identification information for identifying the user of the electronic device 501) with the user identification information related to the nearby device 502 or 503 (e.g., the user identification information for identifying the user of the nearby device 502 or 503). Through operation 825, it may be verified whether the registered user of the nearby device 502 or 503 is the same as the user of the electronic device 501. If the user of the nearby device 502 or 503 is the same as the user of the electronic device 501, the device registration algorithm may be terminated since the premise that the target device 503 is a device not registered in the electronic device 501 is violated.

In operation 830, the electronic device 501 may receive response data transmitted by the nearby device 502 or 503 (e.g., response data containing information indicating that user identification information is not present in the nearby device 502 or 503, or response data containing information indicating the user identification information related to the nearby device 502 or 503 does not match the user identification information related to the electronic device 501), and the electronic device 501 may verify whether the user has the intention to register the target device 503 and request unique identification information of the target device 503 from the user. That is, the currently found nearby device 502 or 503 may be a device that is of the same device type as the target device 503 and has never been registered in the electronic device 501.

In operation 835, the nearby device 502 or 503 may receive, from the electronic device 501, device unique identification information of the target device 503 input by the user who has the intention to register the device, and compare the received unique identification information of the target device 503 with the unique identification information of the nearby device 502 or 503. The unique identification information may be a series of unique information (e.g., a serial number or a PIN) assigned to the device for identifying the device, and the target device 503 may be accurately specified through the unique identification information. If the unique identification information of the target device 503 and the unique identification information of the nearby device 502 or 503 matches, the current device may correspond to the target device 503. Thus, it will be described hereinafter by specifying the entity performing the algorithm from the nearby device 502 or 503 to the target device 503.

In operation 840, the target device 503 may verify whether the target device 503 includes location information. For example, when an utterance (e.g., "Turn up the living room TV volume") includes location information of the target device 503, the target device 503 may include location information (e.g., the living room) obtained based on the utterance. As another example, even when the target device 503 has been registered in a device control application of another user, the target device 503 may include location information.

In operation 845, when the target device 503 does not include location information, the electronic device 501 may request location information of the target device 503 from the user.

In operation 850, the electronic device 501 may perform offline device registration of the target device 503. The electronic device 501 may perform offline device registration of the target device 503 based on the location information of the target device 503 (e.g., location information of the target device 503 obtained based on a device control utterance, location information of the target device 503 stored in the target device 503, or location information of the target device 503 requested and received from the user) and unique identification information of the target device 503.

In operation 855, the target device 503 registered in the electronic device 501 (e.g., a device control application stored in the electronic device 501) may receive a device control utterance from the electronic device 501 and perform natural language processing on the device control utterance.

In operation 860, the target device 503 may determine whether it is capable of performing a device control instruction included in the device control utterance. Whether it is capable of performing an instruction may be determined based on the function performance capability information and/or the device state information described in FIG. 5.

In operation 865, the target device 503 may perform the device control instruction, and the procedure may be terminated. Hereinafter, an operation of registering an offline registered device online will be described in detail.

Figure 9:
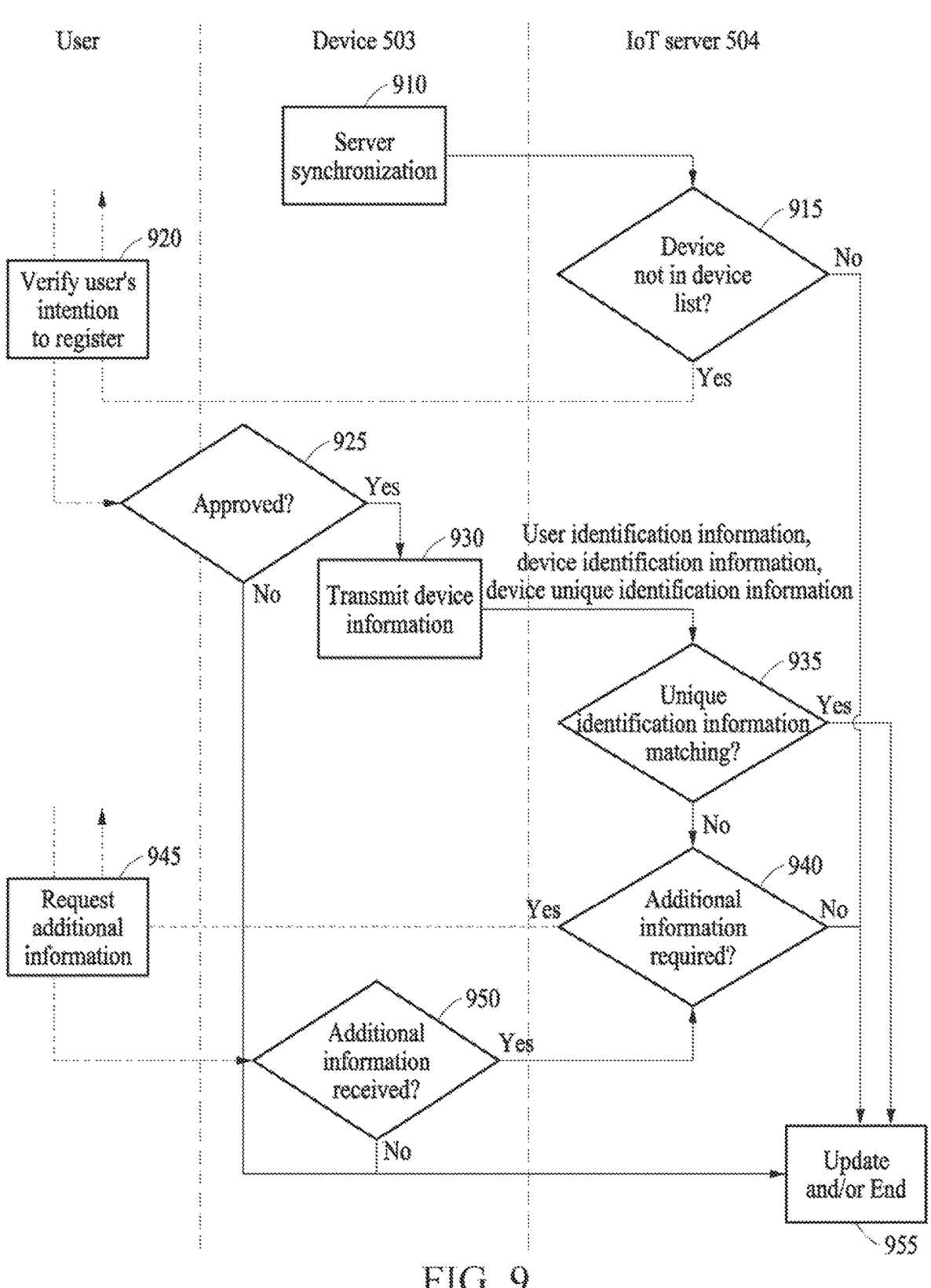
FIG. 9 is a flowchart of an operation of registering an offline registered device online, according to an embodiment.

FIG. 9 is a flowchart of an operation of registering an offline registered device online according to an embodiment.

Operations 910 through 955 may be performed sequentially, but not be necessarily performed sequentially. For example, the order of operations 910 through 955 may be changed, and at least two of operations 910 through 955 may be performed in parallel.

In operation 910, the target device 503 may be connected to the IoT server 504 through a long-range wireless communication network (e.g., the second network 199 of FIG. 1) (e.g., a long-range wireless communication network such as a legacy cellular network, a 5G network, a next-generation communication network, the Internet, or a computer network (e.g., a LAN or a WAN), and may perform synchronization.

In operation 915, the IoT server 504 may verify whether the target device 503 is a device not in an owned device list. If information about the target device 503 is not in the IoT server 504, the target device 503 is an already onboard device, and thus, the onboarding procedure may be terminated.

In operation 920, in relation to the target device 503 registered offline in an electronic device (e.g., the electronic device of FIG. 5), if information about the target device 503 is not in the IoT server 504, the IoT server 504 may verify whether the user has the intention to register the target device 503 online (e.g., perform onboarding).

In operation 925, if the user's intention to register online (e.g., perform onboarding) is received, the onboarding procedure may be performed, and if the user's intention to register is not received, the onboarding procedure may be terminated.

In operation 930, the target device 503 may transmit information about the target device 503 to the IoT server 504 through the long-range wireless communication network. The information about the target device 503 may include user identification information, device identification information (e.g., device type information or location information), device unique identification information (e.g., a serial number or a PIN), and the like.

In operation 935, the IoT server 504 may compare unique identification information (e.g., a serial number or a PIN) stored in the IoT server 504 with the unique identification information of the target device 503. By comparing the unique identification information, the IoT server 504 may verify whether the target device 503 is a controllable and/or registerable device. When the unique identification information stored in the IoT server 504 and the unique identification information of the target device 503 matches, the IoT server 504 may perform online registration (e.g., onboarding) by updating the information about the target device 503 received from the target device 503, and may terminate the onboarding procedure.

In operation 940, when the unique identification information of the target device 503 is not stored in the IoT server 504 or does not match, the IoT server 504 may review whether additional information is required, to verify whether the target device 503 is a reliable device (or a controllable device). When the target device 503 is determined to be an unreliable device (or an uncontrollable device), the onboarding procedure may be terminated.

In operation 945, the IoT server 504 may request additional information about the target device 503 from the user.

In operation 950, the onboarding process may continue when the additional information is received from the user. The IoT server 504 may review whether the target device 503 is a reliable device using the received additional information (e.g., operation 940), and if further additional information is still needed, may request additional information from the user as in operation 945. When additional information is not received from the user, the onboarding procedure may be terminated.

Figure 10:
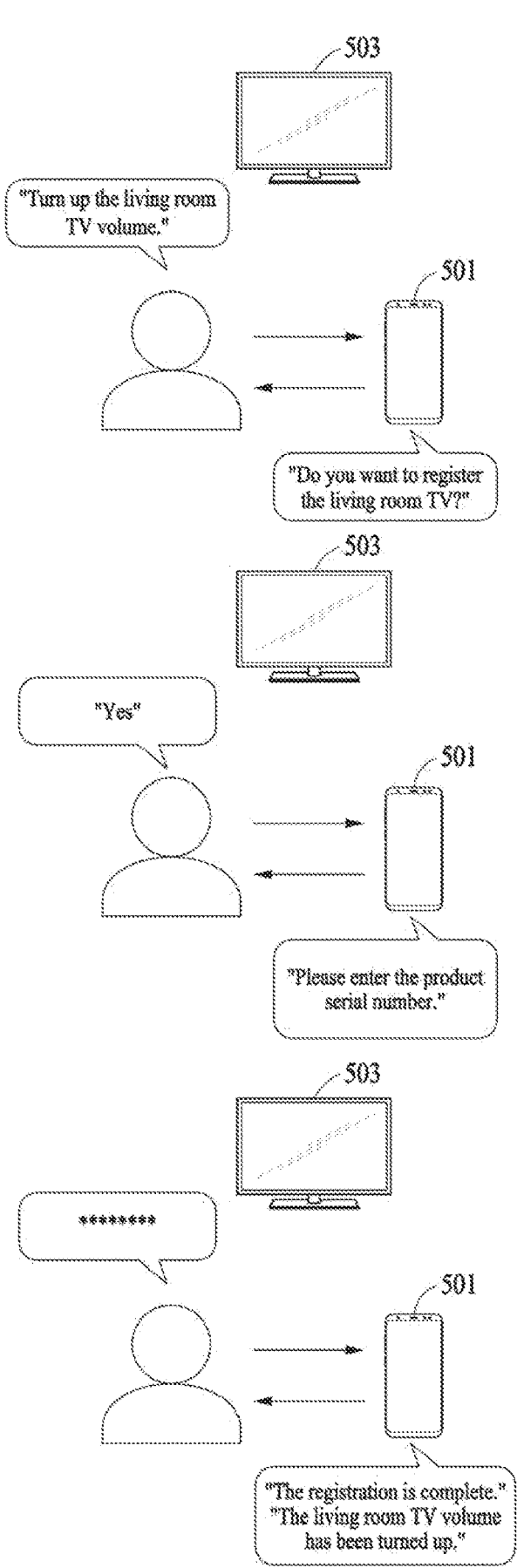
FIG. 10 is a diagram illustrating an example of offline device registration, according to an embodiment.

FIG. 10 is a diagram illustrating an example of offline device registration according to an embodiment.

Referring to FIG. 10, according to an embodiment, the electronic device 501 may receive an utterance (e.g., "Turn up the living room TV volume") from a user. When the utterance is a device control instruction for the target device 503 to be controlled (e.g., a TV), the electronic device 501 may verify whether the target device 503 is registered in the electronic device 501 (e.g., the device control application stored in the electronic device 501). If the target device 503 is a device that is not registered in the electronic device 501, the electronic device 501 may search for the target device 503 among nearby devices based on identification information (e.g., device type (e.g., TV) information) of the target device, which is obtained based on the utterance, and the pre-stored information about the electronic device 501 (e.g., user identification information for identifying the user of the electronic device 501). In relation to a found target device 503, the electronic device 501 may request unique identification information (e.g., a serial number or a PIN) of the target device 503 from the user (e.g., "Please enter the product serial number"). The electronic device 501 may compare the unique identification information of the target device 503 received from the user with unique identification information stored in the target device 503. When the unique identification information of the target device 503 received from the user matches the unique identification information stored in the target device 503, the electronic device 501 may perform offline device registration, perform a device control instruction corresponding to the utterance, and provide the user with a response (e.g., "The registration is complete" or "The living room TV volume has been turned up"). The electronic device 501 may provide a simplified device registration procedure by using identification information of the target device 503 obtained by processing natural language processing on the utterance (e.g., location information of the target device 503: the living room).

Figure 11:
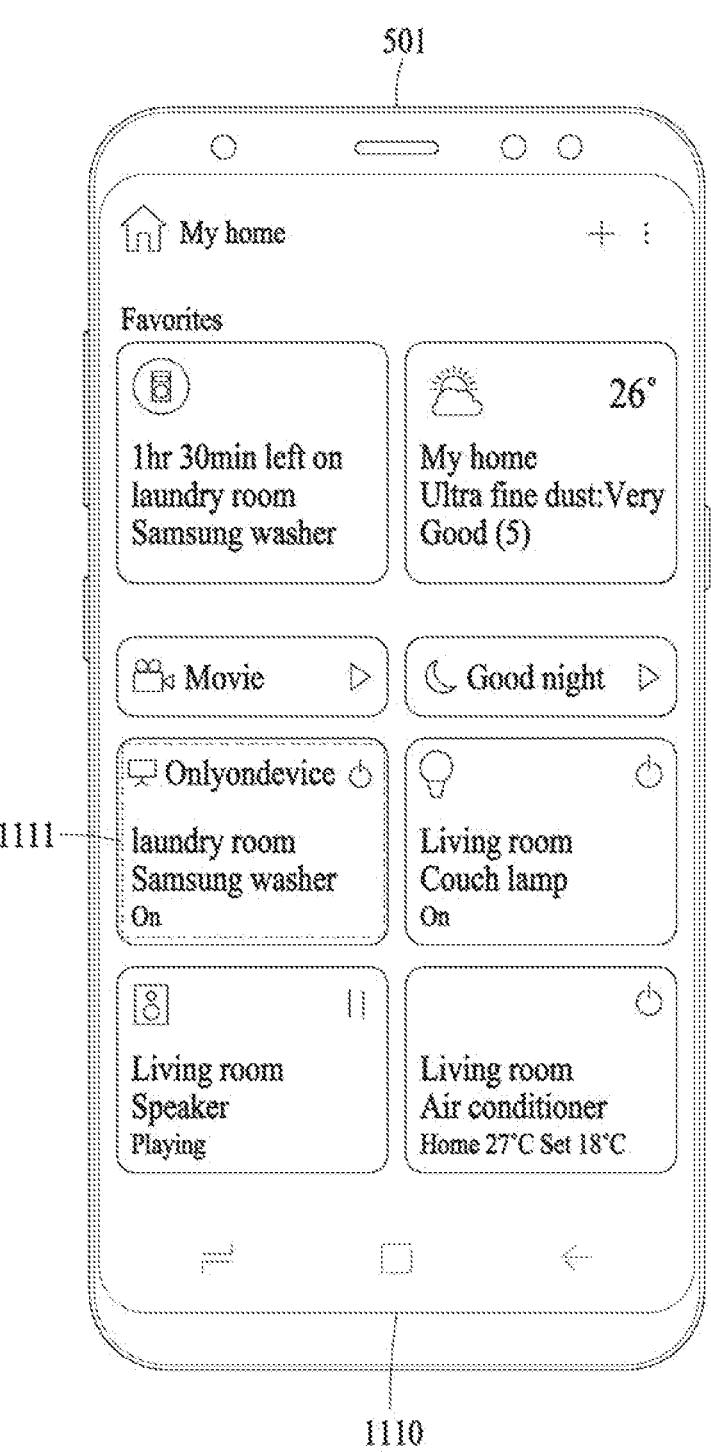
FIG. 11 illustrates an example of a screen displaying a registered device by an electronic device, according to an embodiment.

FIG. 11 illustrates an example of a screen displaying a registered device by an electronic device according to an embodiment.

Referring to FIG. 11, according to an embodiment, the electronic device 501 may display registered (or onboard) devices through a screen 1110. A device (e.g., a TV) displayed in an area 1111 may be marked as "Onlyondevice"

unlike other devices, which may indicate that the TV is registered offline only in the electronic device 501 (e.g., a device control application stored in the electronic device 501). The "Onlyondevice" indication may disappear after onboarding (e.g., online registration) of the TV is performed.

Figure 12:
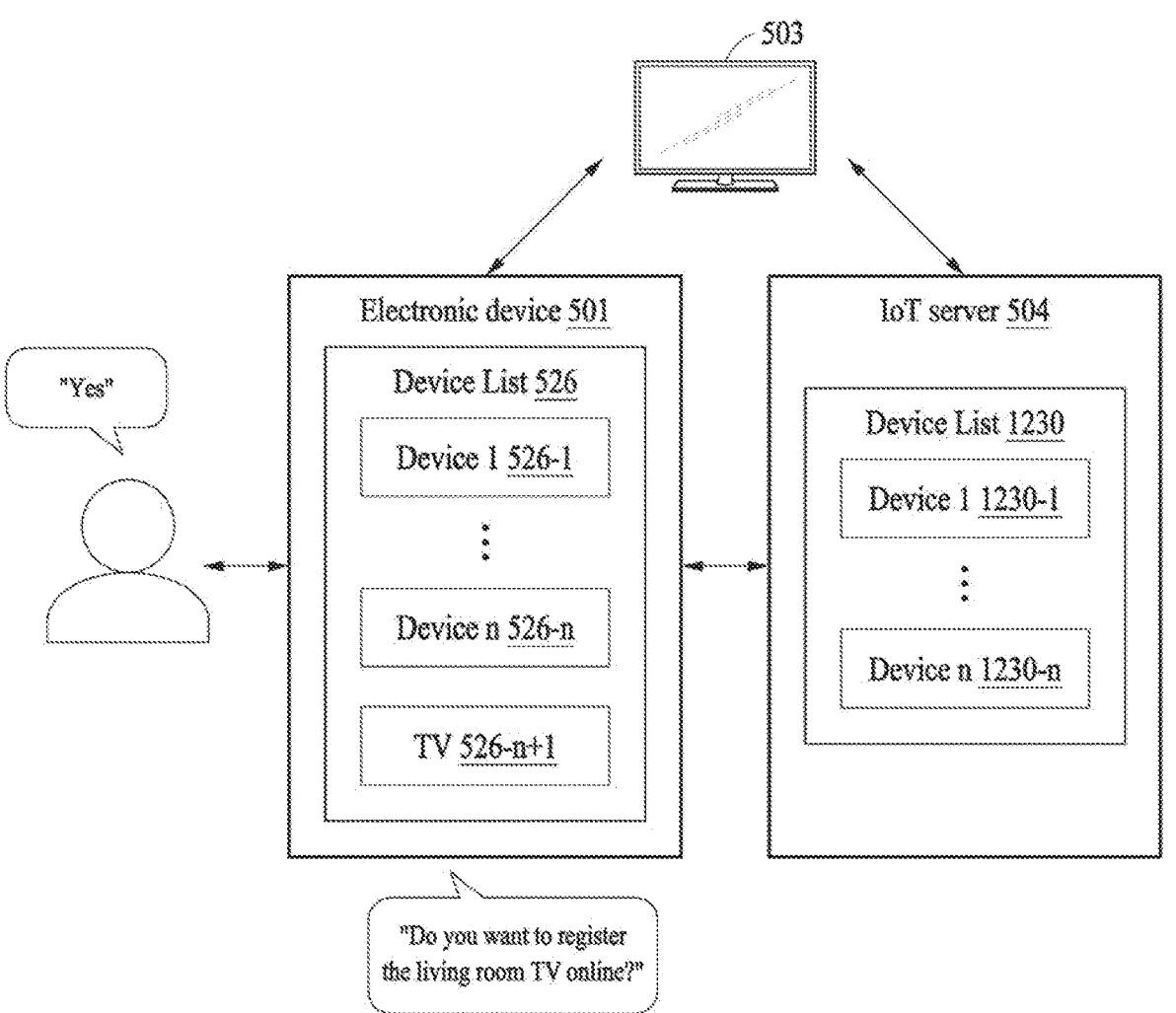
FIG. 12 is a diagram illustrating an example of registering an offline registered device online, according to an embodiment.

FIG. 12 is a diagram illustrating an example of registering an offline registered device online according to an embodiment.

Referring to FIG. 12, according to an embodiment, the electronic device 501, the target device 503, and the IoT server 504 may be interconnected through a long-range wireless communication network (e.g., the second network 199 of FIG. 1) (e.g., a long-range wireless communication network such as a legacy cellular network, a 5G network, a next-generation communication network, the Internet, or a computer network (e.g., a LAN or a WAN).

According to an embodiment, the target device 503 may be a device registered in the electronic device 501 (e.g., a device control application of the electronic device 501) through offline device registration. Through offline device registration, information about the target device 503 may be stored in the owned device list 526 included in the memory of the electronic device 501. The target device 503 may be connected to the IoT server 504 through the long-range wireless communication network (e.g., the second network 199 of FIG. 1) (e.g., a long-range wireless communication network such as a legacy cellular network, a 5G network, a next-generation communication network, the Internet, or a computer network (e.g., a LAN or a WAN), and may perform synchronization. The IoT server 504 may verify whether the target device 503 is a device present in an owned device list 1230. If information about the target device 503 is not in the IoT server 504, the IoT server 504 may verify whether the user has the intention to register the target device 503 online (e.g., perform onboarding) through the electronic device 501 (e.g., utter "Do you want to register the living room TV online?"). When the user's intention to register online (e.g., perform onboarding) is received (e.g., an utterance "Yes"), the target device 503 may perform online registration (e.g., onboarding) by transmitting information on the target device 503 to the IoT server 504 through the long-range wireless communication network. When the target device 503 is connected online, the target device 503 may perform a simplified onboarding (e.g., online device registration) procedure by using information exchanged during the offline device registration procedure.

FIG. 13 is a flowchart illustrating an example of a method of operating an electronic device according to an embodiment.

Operations 1310 through 1350 may be performed sequentially, but not be necessarily performed sequentially. For example, the order of operations 1310 through 1350 may be changed, and at least two of operations 1310 through 1350 may be performed in parallel.

In operation 1310, a processor (e.g., the processor 510 of FIG. 7) may verify whether a target device to be controlled (e.g., the target device 503 of FIG. 5) is registered in an electronic device (e.g., the electronic device 501 of FIG. 5), when an utterance is a device control instruction for the target device 503.

In operation 1330, the processor 510 may search for the target device 503 among nearby devices (e.g., the nearby devices 502 and 503 of FIG. 5) based on identification information of the target device 503 obtained based on the utterance and information about the electronic device 501, when the target device 503 is a device not registered in the electronic device 501.

In operation 1350, the processor 510 may perform offline device registration of the target device 503 by performing communication with a found device.

According to an embodiment, an electronic device (e.g., the electronic device 101 of FIG. 1, the electronic device 201 of FIG. 2, the electronic device 501 of FIG. 5, or the electronic device 501 of FIG. 5) may include: a communication module (e.g., the communication module 530 of FIG. 7) configured to communicate with nearby devices (e.g., the user nearby devices 502 and 503 of FIG. 5) located around the electronic device 501; at least one processor (e.g., the processor 510 of FIG. 7) operatively connected to the communication module 530; and a memory (e.g., the memory 520 of FIG. 7) configured to store instructions and information about the electronic device 501 and operatively connected to the at least one processor 510, wherein when the instructions are executed by the at least one processor 510, the at least one processor 510 may be configured to verify whether a target device 503 to be controlled is registered in the electronic device 501, when an utterance is a device control instruction for the target device 503, search for the target device 503 among the nearby devices 502 and 503 based on identification information of the target device 503 obtained based on the utterance and the information about the electronic device 501, when the target device 503 is a device not registered in the electronic device 501, and perform offline device registration of the target device 503 by performing communication with a found device 502 or 503.

According to an embodiment, the identification information of the target device 503 may include at least one of device type information of the target device 503 or location information of the target device 503.

According to an embodiment, the information about the electronic device 501 may include user identification information related to the electronic device 501.

According to an embodiment, the processor 510 may be further configured to perform speech recognition on the user utterance, and obtain the identification information of the target device 503 by performing natural language processing on a speech recognition result.

According to an embodiment, the processor 510 may be further configured to search for the target device 503 among the nearby devices 502 and 503 by broadcasting data containing the identification information of the target device 503 and the information about the electronic device 501 to the nearby devices 502 and 503, and perform offline device registration of the target device 503 based on response data transmitted by the nearby devices 502 and 503 in response to the data.

According to an embodiment, each of the nearby devices 502 and 503 may be configured to determine whether the nearby device 502 or 503 corresponds to the target device 503 based on device type information of the target device 503, user identification information related to the electronic device 501, and unique identification information of the target device 503, and transmit response data generated based on a determination result to the electronic device 501.

According to an embodiment, each of the nearby devices 502 and 503 may be configured to compare device type information of the target device 503 with device type information of the nearby device 502 or 503, compare user identification information related to the electronic device 501 with user identification information related to the nearby device 502 or 503, when the device type information matches, request unique identification information of the target device 503 from the electronic device 501, when the user identification information does not matches, compare the unique identification information of the target device 503 received from the electronic device 501 with unique identification information of the nearby device 502 or 503, and transmit response data containing information indicating that the nearby device 502 or 503 corresponds to the target device 503 to the electronic device 501, when the unique identification information matches.

According to an embodiment, each of the nearby devices 502 or 503 may be configured to request the unique identification information of the target device 503 from the electronic device 501, when the user identification information related to the electronic device 501 does not match the user identification information related to the nearby device 502 or 503 or when user identification information related to the nearby device 502 or 503 is absent.

According to an embodiment, the processor 510 may be further configured to perform offline device registration of the target device 503 based on location information of the target device 503 and unique identification information of the target device 503, and transmit the device control instruction to the target device 503.

According to an embodiment, the target device 503 may be configured to perform onboarding by transmitting information about the target device 503 to an IoT server (e.g., the IoT server 504 of FIG. 5).

According to an embodiment, a method of operating an electronic device 501 may include: verifying whether a target device 503 to be controller is registered in the electronic device 501, when an utterance is a device control instruction for the target device 503; searching for the target device 503 among nearby devices 502 and 503 located around the electronic device 501 based on identification information of the target device 503 obtained based on the utterance and the information about the electronic device 501, when the target device 503 is a device not registered in the electronic device 501; and performing offline device registration of the target device 503 by communicating with a found device 502 or 503.

According to an embodiment, the identification information of the target device 503 may include at least one of device type information of the target device 503 or location information of the target device 503.

According to an embodiment, the information about the electronic device 501 may include user identification information related to the electronic device 501.

According to an embodiment, the method of operating the electronic device 501 may further include: performing speech recognition on the user utterance; and obtaining the identification information of the target device 503 by performing natural language processing on a speech recognition result.

According to an embodiment, the searching for the target device 503 may include searching for the target device 503 among the nearby devices 502 and 503 by broadcasting data containing the identification information of the target device 503 and the information about the electronic device 501 to the nearby devices 502 and 503, and the performing of the device registration may include performing offline device registration of the target device 503 based on response data transmitted by the nearby devices 502 and 503 in response to the data.

According to an embodiment, the performing of the device registration may include determining, by each of the nearby device devices 502 and 503, whether the nearby device 502 or 503 corresponds to the target device 503 based on device type information of the target device 503, user identification information related to the electronic device 501, and unique identification information of the target device 503; and transmitting, by each of the nearby devices 502 and 503, response data generated based on a determination result to the electronic device 501.

According to an embodiment, the performing of the device registration may include comparing, by each of the nearby devices 502 and 503, device type information of the target device 503 with device type information of the nearby device 502 or 503; comparing, by each of the nearby devices 502 and 503, user identification information related to the electronic device 501 with user identification information related to the nearby device 502 or 503, when the device type information matches; requesting, by each of the nearby devices 502 and 503, unique identification information of the target device 503 from the electronic device 501, when the user identification information does not match; comparing, by each of the nearby devices 502 and 503, the unique identification information of the target device 503 received from the electronic device 501 with unique identification information of the nearby device 502 or 503; and transmitting, by each of the nearby devices 502 and 503, response data containing information indicating that the nearby device 502 or 503 corresponds to the target device 503 to the electronic device 501, when the unique identification information matches.

According to an embodiment, the requesting may include requesting, by each of the nearby devices 502 and 503, the unique identification information of the target device 503 from the electronic device 501, when the user identification information related to the electronic device 501 does not match the user identification information related to the nearby device 502 or 503 or when user identification information related to the nearby device 502 or 503 is absent.

According to an embodiment, the performing of the device registration may include performing offline device registration of the target device 503 based on location information of the target device 503 and unique identification information of the target device 503; and transmitting the device control instruction to the target device 503.

According to an embodiment, the method of operating the electronic device 501 may further include performing onboarding by transmitting information about the target device 503 to an IoT server 504.

The electronic device according to the embodiments disclosed herein may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 1740) including one or more instructions that are stored in a storage medium (e.g., an internal memory 1736 or an external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

The embodiments of the present disclosure have been shown and described above with reference to the accompanying drawings. The embodiments disclosed in the specification and drawings are only intended to provide specific examples for easily describing the technical content of the disclosure and for assisting understanding of the disclosure, and are not intended to limit the scope of the disclosure. It will be understood by those of ordinary skill in the art that the present disclosure may be easily modified into other detailed forms without changing the technical principle or essential features of the present disclosure, and without departing from the gist of the disclosure as claimed by the appended claims and their equivalents. Therefore, it should be interpreted that the scope of the disclosure includes all changes or modifications derived based on the technical idea of the disclosure in addition to the embodiments disclosed herein.

What is claimed is:

1. An electronic device, comprising:
a communication module configured to communicate with at least one nearby device located in a communication range of the electronic device;
a memory configured to store information about the electronic device and at least one instruction; and
at least one processor operatively connected to the communication module and the memory, the at least one processor configured to execute the at least one instruction to:
verify, based on an utterance of a device control instruction for controlling a target device, whether the target device is registered in the electronic device,
search for the target device among the at least one nearby device by broadcasting data containing identification information of the target device obtained from the utterance and the information about the electronic device to the at least one nearby device, based on a determination that the target device is a device not registered in the electronic device,
receive, from an external electronic device that is one of the at least one nearby device, a request for unique identification information of the target device, wherein the request is received based on the external electronic device determining that device type information of the target device matches device type information of the external electronic device and that user identification information related to the electronic device does not match user identification information related to the external electronic device,
transmit the unique identification information of the target device to the external electronic device in response to the request,
receive, from the external electronic device, response data comprising information indicating that the external electronic device corresponds to the target device, wherein the response data is received based on the external electronic device determining that the unique identification information of the target device matches unique identification information of the external electronic device,
perform offline device registration of the external electronic device as the target device by performing communication with the external electronic device, and
transmit the device control instruction to the target device.

2. The electronic device of claim 1, wherein the identification information of the target device comprises at least one of device type information of the target device, or location information of the target device.

3. The electronic device of claim 1, wherein the information about the electronic device comprises the user identification information related to the electronic device.

4. The electronic device of claim 1, wherein the at least one processor is further configured to execute the at least one instruction to:
perform speech recognition on the utterance to obtain a speech recognition result; and
obtain the identification information of the target device by performing natural language processing on the speech recognition result.

5. The electronic device of claim 1, wherein the at least one processor is further configured to execute the at least one instruction to:
perform the offline device registration of the target device based on location information of the target device and the unique identification information of the target device.

6. A method of operating an electronic device, comprising:
verifying, based on an utterance of a device control instruction for controlling a target device, whether the target device is registered in the electronic device;
searching for the target device among at least one nearby device located in a communication range of the electronic device by broadcasting data containing identification information of the target device obtained from the utterance and information about the electronic device to the at least one nearby device, based on a determination that the target device is a device not registered in the electronic device;
receiving, from an external electronic device that is one of the at least one nearby device, a request for unique identification information of the target device, wherein the request is received based on the external electronic device determining that device type information of the target device matches device type information of the external electronic device and that user identification information related to the electronic device does not match user identification information related to the external electronic device;
transmitting the unique identification information of the target device to the external electronic device in response to the request;
receiving, from the external electronic device, response data comprising information indicating that the external electronic device corresponds to the target device, wherein the response data is received based on the external electronic device determining that the unique identification information of the target device matches unique identification information of the external electronic device;
performing offline device registration of the external electronic device as the target device by performing communication with the external electronic device; and transmitting the device control instruction to the target device.

7. The method of claim 6, wherein the identification information of the target device comprises at least one of device type information of the target device, or location information of the target device.

8. The method of claim 6, wherein the information about the electronic device comprises the user identification information related to the electronic device.

9. The method of claim 6, further comprising:

performing speech recognition on the utterance to obtain a speech recognition result; and obtaining the identification information of the target device by performing natural language processing on the speech recognition result.

10. The method of claim 6, wherein the performing the offline device registration comprises:

performing offline device registration of the target device based on location information of the target device and the unique identification information of the target device.

* * * * *